United States Patent
Roberts

(10) Patent No.: US 8,584,277 B1
(45) Date of Patent: *Nov. 19, 2013

(54) MATTRESS FOUNDATION CORNER CONNECTOR AND BED FRAME ASSEMBLY

(76) Inventor: Thomas A. Roberts, Morristown, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,131

(22) Filed: Jan. 9, 2012

Related U.S. Application Data

(63) Continuation-in-part of application No. 12/931,329, filed on Jan. 28, 2011, now Pat. No. 8,122,537, and a continuation-in-part of application No. 12/661,068, filed on Mar. 10, 2010, now Pat. No. 7,900,300, and a continuation-in-part of application No. 12/152,194, filed on May 13, 2008, now Pat. No. 7,703,155.

(51) Int. Cl.
*A47C 19/00* (2006.01)

(52) U.S. Cl.
USPC ........................................ 5/400; 5/282.1; 5/1

(58) Field of Classification Search
USPC ........ 5/400, 200.1, 282.1; 403/364, 231, 188, 403/252, 255, 264, 262, 295, 331, 382, 401, 403/403
See application file for complete search history.

(56) References Cited

U.S. PATENT DOCUMENTS

| | | |
|---|---|---|
| 4,319,370 A | 3/1982 | Robinson |
| 4,391,008 A | 7/1983 | Yamaoka et al. |
| D278,489 S | 4/1985 | Ragland |
| D289,572 S | 4/1987 | Wanta |
| 4,729,136 A | 3/1988 | Santo |
| 4,734,946 A | 4/1988 | Saputo |
| 5,099,529 A | 3/1992 | Anderson |
| 5,469,589 A | 11/1995 | Steed et al. |
| 5,564,140 A | 10/1996 | Shoenhair et al. |
| D384,537 S | 10/1997 | Quintile |
| 5,709,500 A | 1/1998 | Mizelle et al. |

(Continued)

FOREIGN PATENT DOCUMENTS

| JP | 08009776 | 1/1996 |
|---|---|---|
| JP | 2001061601 | 3/2001 |

*Primary Examiner* — Peter M Cuomo
*Assistant Examiner* — Brittany Wilson
(74) *Attorney, Agent, or Firm* — Wooten & Shaddock, PLC

(57) ABSTRACT

A corner connector having a pie-shaped body portion formed by a first abutment surface, a second abutment surface, and a radiused surface, wherein the first abutment surface and the second abutment surface are formed at substantially 90° relative to one another; wherein a first portion of the first abutment surface extends from a substantially planar bottom surface to a substantially planar deck panel support surface and wherein a second portion of the first abutment surface extends from the bottom surface above the deck panel support surface; wherein a first portion of the second abutment surface extends from the bottom surface to the deck panel support surface and wherein a second portion of the second abutment surface extends from the bottom surface above the deck panel support surface; and one or more protrusions extend perpendicularly from the first abutment surface and the second abutment surface.

20 Claims, 41 Drawing Sheets

(56) References Cited

U.S. PATENT DOCUMENTS

| | | |
|---|---|---|
| 5,758,372 A | 6/1998 | Lopez Diaz |
| 5,884,385 A | 3/1999 | Quintile |
| D422,201 S | 4/2000 | Jarnagin et al. |
| D427,894 S | 7/2000 | Benz et al. |
| D428,804 S | 8/2000 | Benz et al. |
| 6,125,488 A | 10/2000 | Vogland et al. |
| D435,788 S | 1/2001 | Bunning |
| 6,286,161 B1 | 9/2001 | McCall |
| D484,780 S | 1/2004 | Barile |
| 6,978,498 B2 | 12/2005 | Gavela Vazquez |
| 2003/0028963 A1 | 2/2003 | McCraw et al. |
| 2005/0028274 A1 | 2/2005 | Hooper |
| 2005/0039258 A1 | 2/2005 | Gavela Vazquez |
| 2005/0039259 A1 | 2/2005 | Gladney |
| 2005/0235417 A1 | 10/2005 | Koughan et al. |
| 2007/0220680 A1 | 9/2007 | Miller et al. |
| 2008/0235868 A1 | 10/2008 | Snitzer et al. |

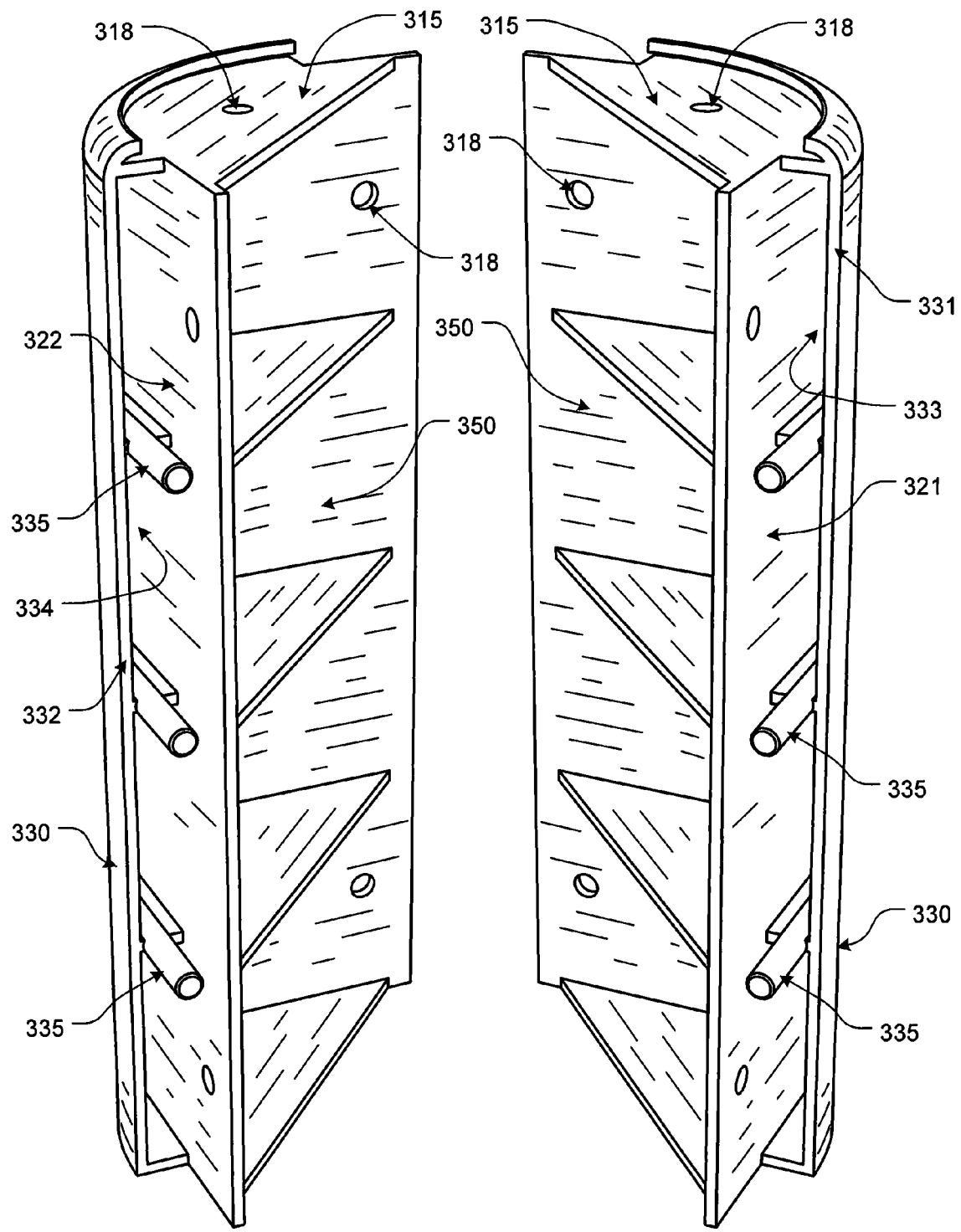
*FIG. 26*     *FIG. 27*

MATTRESS FOUNDATION CORNER CONNECTOR AND BED FRAME ASSEMBLY

CROSS-REFERENCE TO RELATED APPLICATIONS

This is a Continuation-In-Part of co-pending U.S. patent application Ser. No. 12/931,329, filed Jan. 28, 2011, which is a Continuation-In-Part of U.S. patent application Ser. No. 12/661,068, filed Mar. 10, 2010 (U.S. Pat. No. 7,900,300), which is a Continuation-In-Part of U.S. patent application Ser. No. 12/152,194, filed May 13, 2008 (U.S. Pat. No. 7,703,155), the disclosures of which are incorporated herein by reference in their entireties.

STATEMENT REGARDING FEDERALLY SPONSORED RESEARCH OR DEVELOPMENT

Not applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. All trademarks and service marks identified herein are owned by the applicant.

BACKGROUND OF THE INVENTION

1. Field of the Invention

This invention relates generally to mattress foundation assemblies. In particular, the present invention relates to improved mattress foundation corner connectors, mattress foundation assemblies, and a method for constructing the mattress foundation assembly.

2. Description of Related Art

Typically, mattress foundations and bases are constructed by hand from various pieces of Pine or other lightweight woods. These built-up mattress foundations are formed in a generally rectangular fashion and are sometimes sawed at each corner in an effort to replicate the rounded corners of conventional mattresses.

Various external jigs and fixtures must be used in order to assemble the numerous components of the mattress foundations. Once aligned, the various pieces or components are typically nailed together.

SUMMARY OF THE INVENTION

However, constructing mattress foundations using known methods is typically time-consuming, requires relatively skilled workers, requires numerous components and tools, and does not always result in a secure or square mattress foundation.

Thus, the present invention relates generally to improved mattress foundation assemblies. In particular, the present invention relates to improved mattress foundation corner connectors, mattress foundation assemblies, and a method for constructing the mattress foundation assembly.

In various exemplary embodiments, the mattress foundation assembly is constructed of Medium Density Fiberboard (MDF) and/or plastic components. The overall part count is significantly lower than that of other foundations. This low parts count greatly reduces the number of contact points between components in the assembly, and virtually eliminates the potential for bothersome squeaks caused by friction.

In various exemplary embodiments, the mattress foundation assembly comprises four shaped perimeter rails (first and second side rail elements and first and second header elements), joined to four corner connector elements. The profile of the perimeter rails has been designed to provide smooth, rounded horizontal outer edges, and includes a recessed notch to accommodate a flush-mounted top deck panel. Vertical grooves are notched into the interior face of the perimeter rails and serve to align the interior support ribs and spine element during the assembly process, without the need for external jigs and fixtures.

The interior support ribs and spine element are attached together in an interlocking fashion by means of engineered half-lap joints and form the load distribution structure of the mattress foundation. The ribs and spine element, along with the top deck panel also serve to square the entire mattress foundation assembly during and after assembly.

Aesthetically, the corner connector elements serve to round the vertical outer edges of the mattress foundation assembly, while maintaining the radii of the mattress foundation assembly's top and bottom edges. Structurally, the corner connector elements provide substantial impact resistance to corner loading and flexible resistance to parallelogram deformation.

The top deck panel is typically a sheet of thinner MDF, or other material, which provides a single, solid surface upon which the mattress will sit. A solid top deck panel is particularly critical for foam mattresses and is a major improvement over currently constructed mattress foundations, which use soft cardboard atop lumber slats.

In various exemplary embodiments, there is elements of the mattress foundation assembly are fastened together with adhesives. Alternatively, screws or other fasteners may be used to assemble the elements of the mattress foundation. In still other embodiments, both adhesive and screws or other fasteners may be used.

Accordingly, this invention provides a mattress foundation assembly of improved design.

This invention separately provides a mattress foundation assembly having a lower overall part count when compared to other mattress foundations.

This invention separately provides a mattress foundation assembly having improved structural stability.

This invention separately provides a mattress foundation assembly that can be assembled without the need for external jigs and/or fixtures.

This invention separately provides a mattress foundation assembly that can be scaled to accommodate any size mattress.

This invention separately provides a mattress foundation assembly that is less expensive to manufacture.

This invention separately provides a corner connector element of improved design.

This invention separately provides a scalable corner connector element.

This invention separately provides a corner connector element that is relatively lightweight.

This invention separately provides a corner connector element that can be produced in mass quantity from plastic, wood, or other any other suitable material.

These and other features and advantages of this invention are described in or are apparent from the following detailed description of the exemplary, non-limiting embodiments.

BRIEF DESCRIPTION OF THE DRAWINGS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein:

FIG. 26 is a left perspective view of the third exemplary embodiment of a corner connector element according to this invention;

FIG. 27 is a right perspective view of the third exemplary embodiment of a corner connector element according to this invention;

DETAILED DESCRIPTION OF EXEMPLARY EMBODIMENTS

Figure 1:
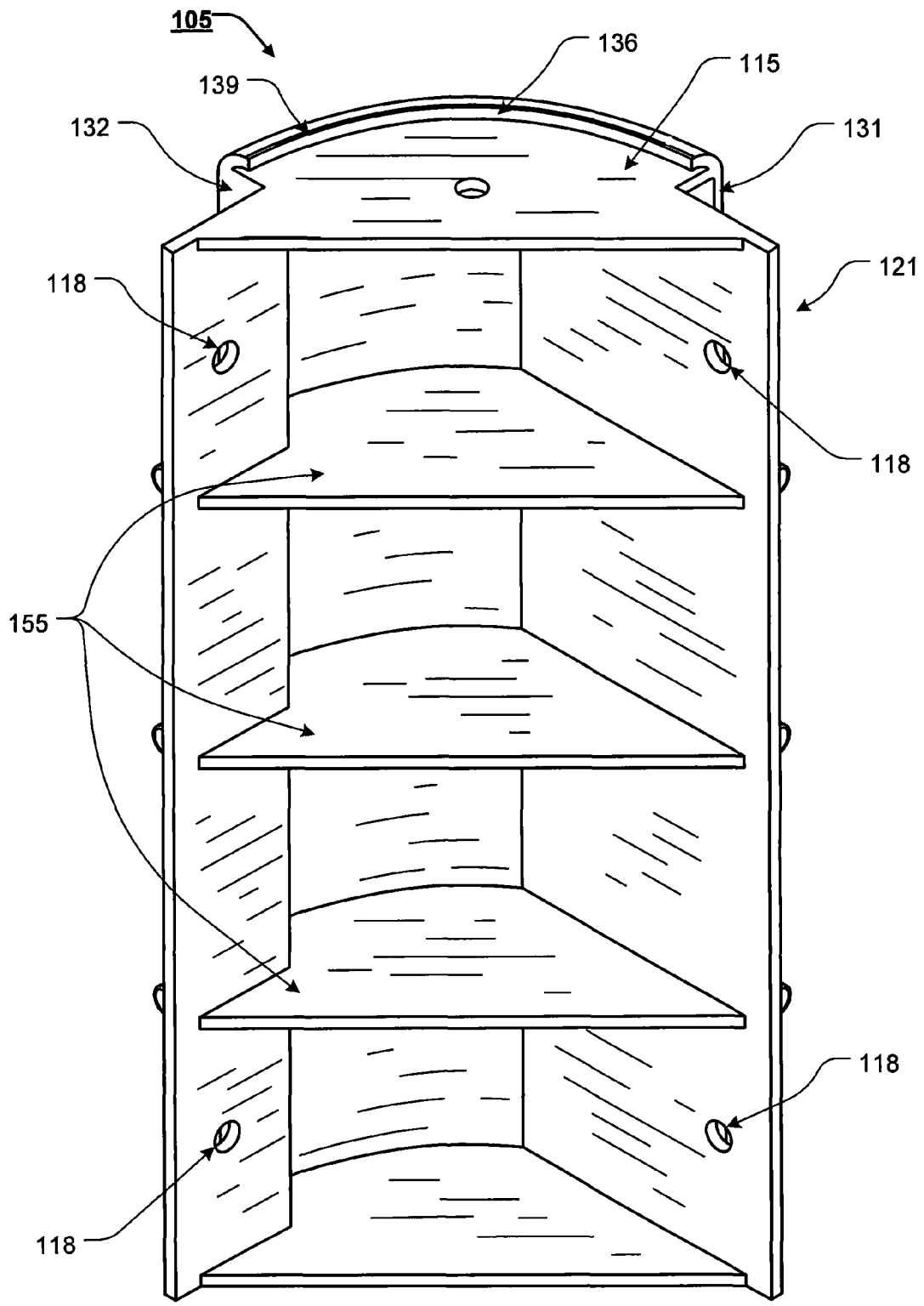
FIG. 1 is an isometric view of a first exemplary embodiment of a corner connector element according to this invention.
Figure 2:
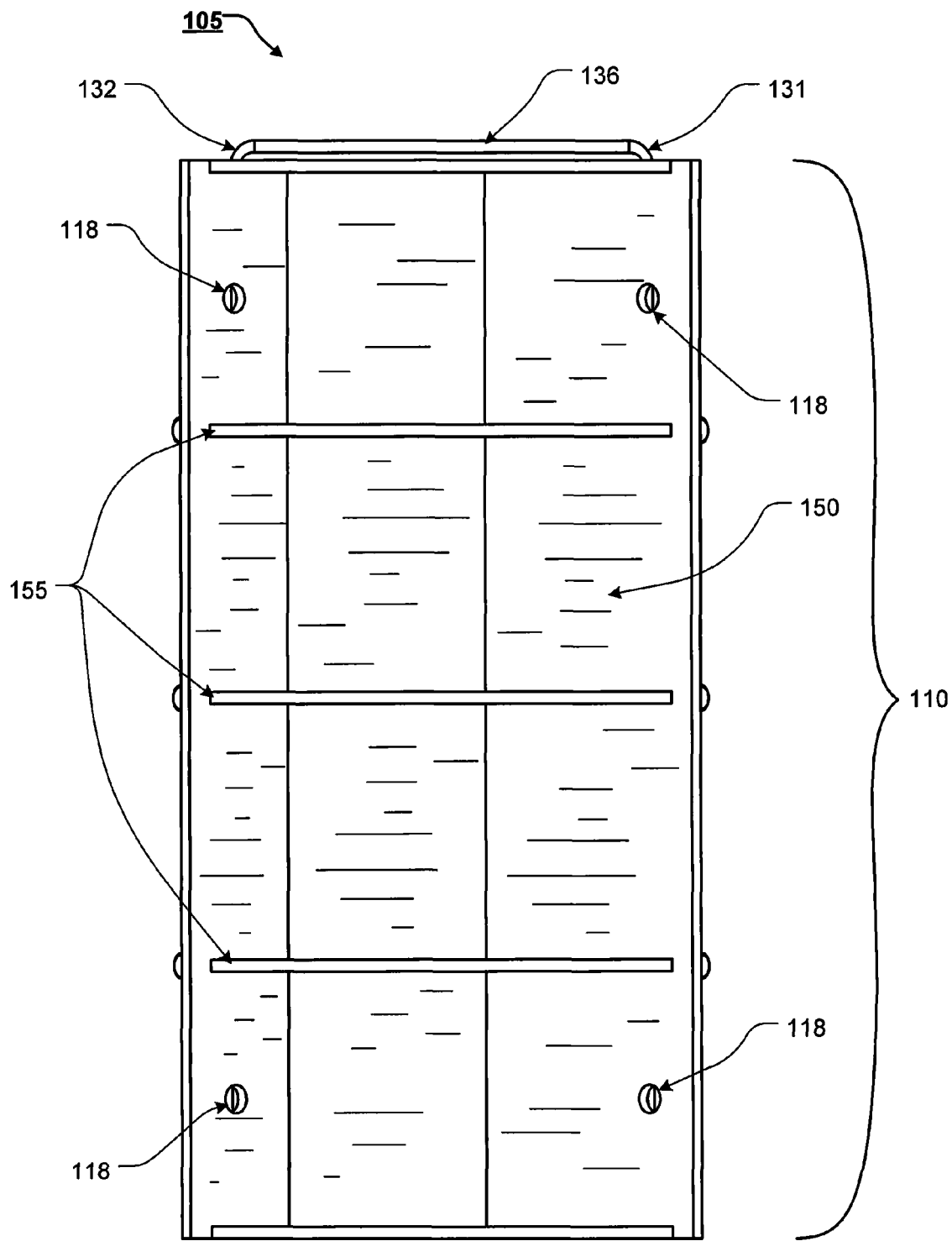
FIG. 2 is a front view of a first exemplary embodiment of a corner connector element according to this invention.
Figures 3, 4:
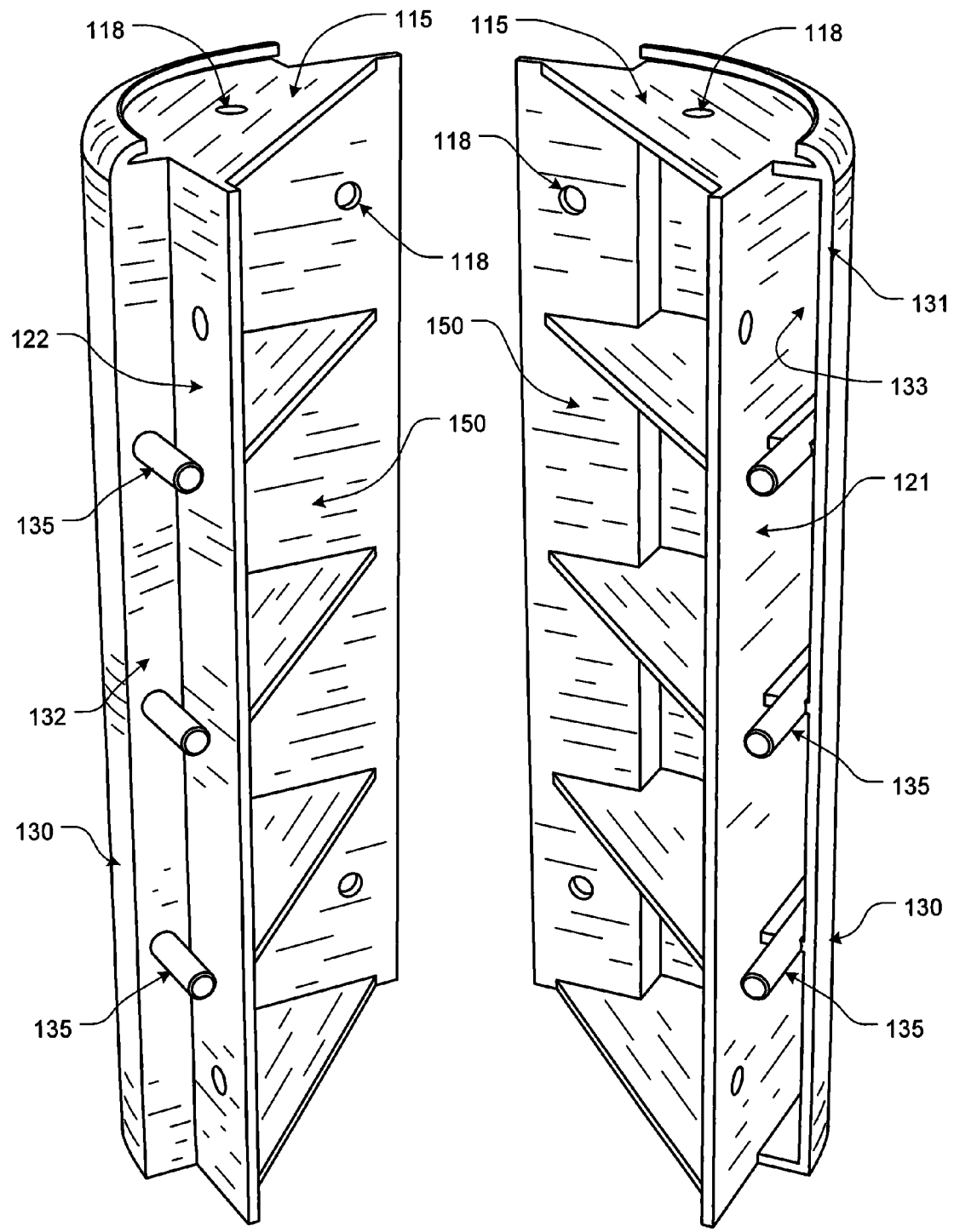
FIG. 3 is a left perspective view of a first exemplary embodiment of a corner connector element according to this invention.
FIG. 4 is a right perspective view of a first exemplary embodiment of a corner connector element according to this invention.
Figure 5:
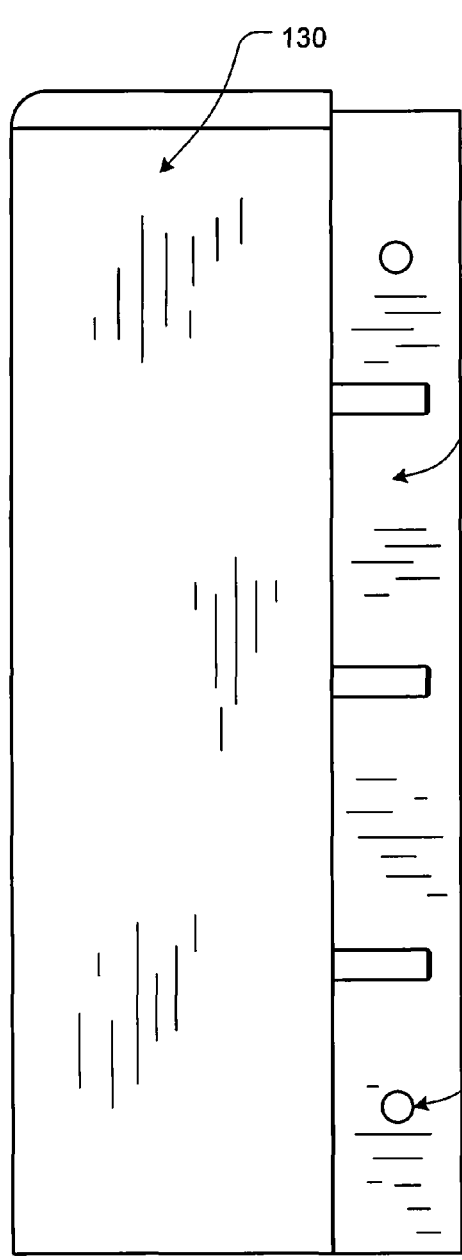
FIG. 5 is a left view of a first exemplary embodiment of a corner connector element according to this invention.
Figure 6:
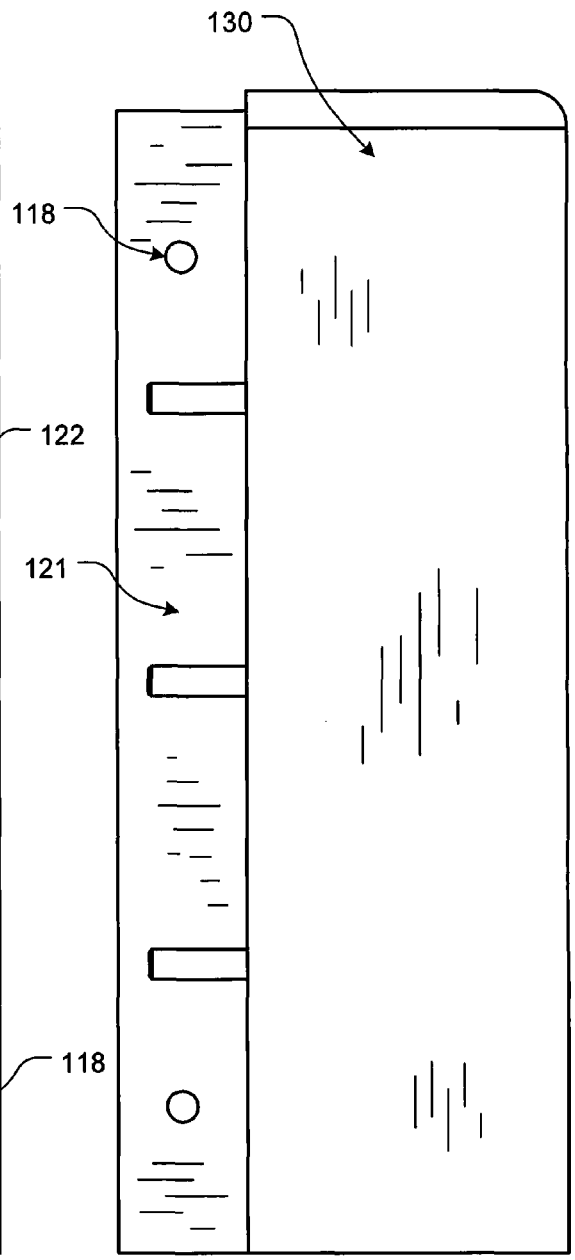
FIG. 6 is a right view of a first exemplary embodiment of a corner connector element according to this invention.
Figure 7:
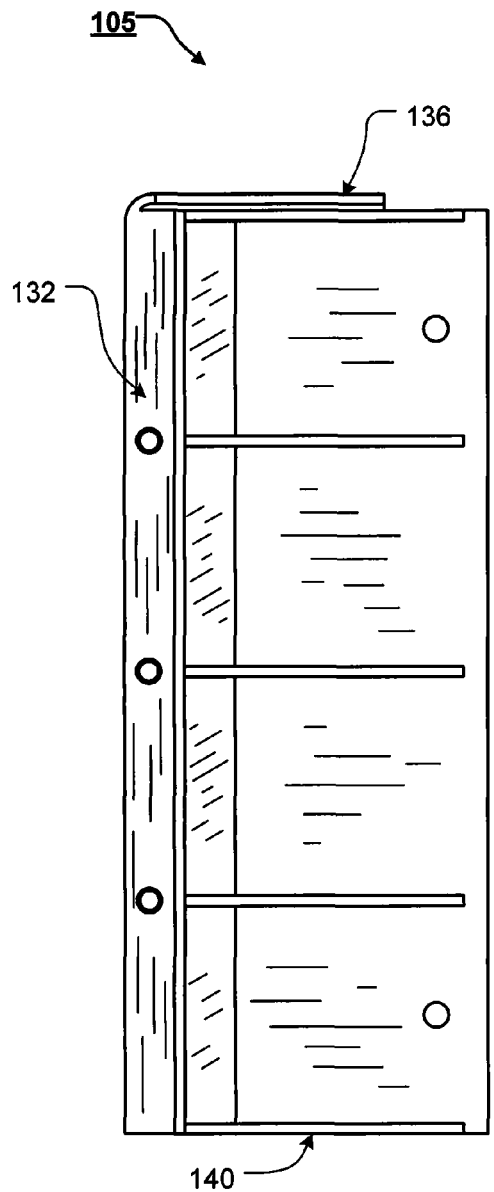
FIG. 7 is a left side view of a first exemplary embodiment of a corner connector element according to this invention.
Figure 8:
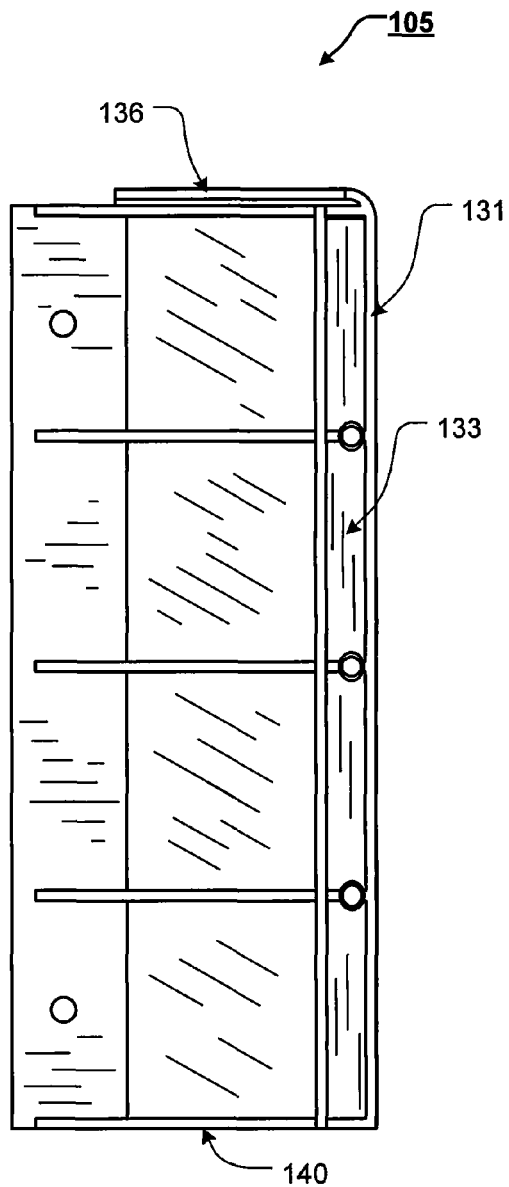
FIG. 8 is a right side view of a first exemplary embodiment of a corner connector element according to this invention.
Figure 9:
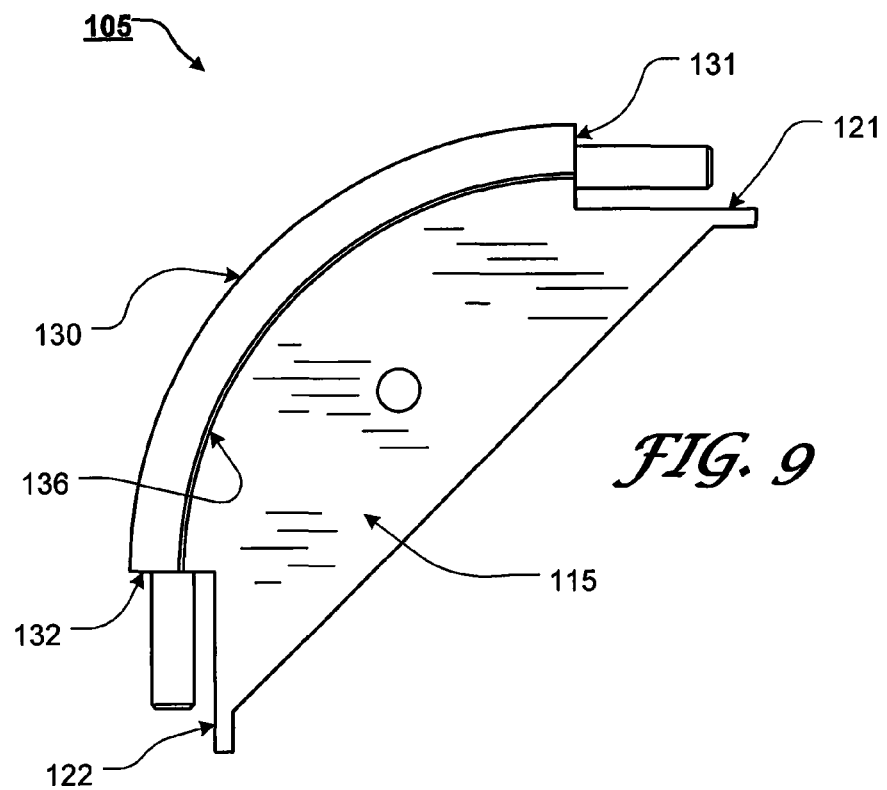
FIG. 9 is a top plan view of a first exemplary embodiment of a corner connector element according to this invention.
Figure 10:
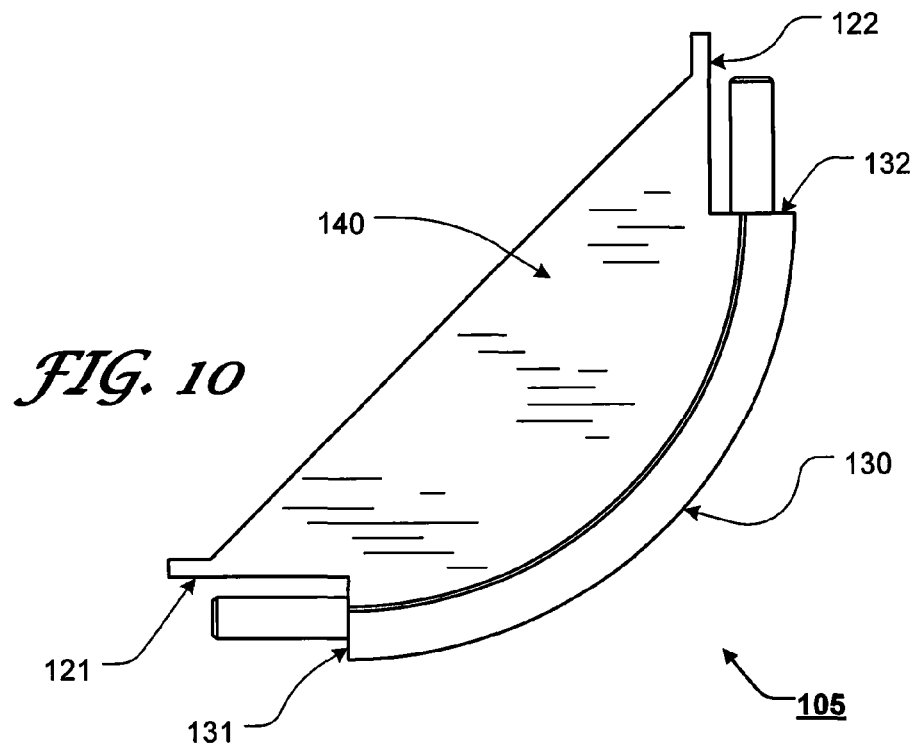
FIG. 10 is a bottom plan view of a first exemplary embodiment of a corner connector element according to this invention.
Figure 11:
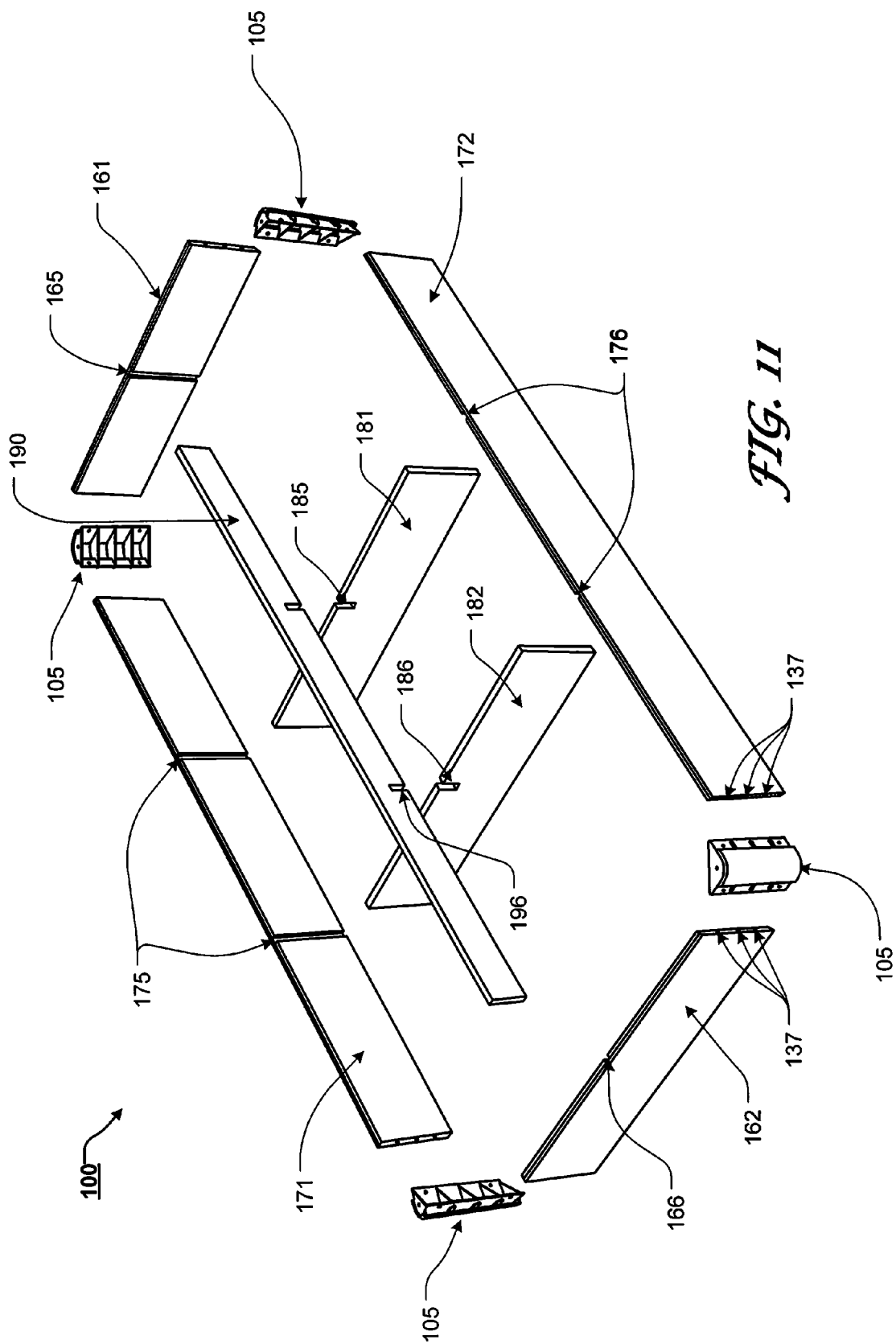
FIG. 11 shows an exploded perspective view of a first exemplary embodiment of certain of the components of a mattress foundation assembly according to this invention.

For simplicity and clarification, the design factors and operating principles of the mattress foundation corner connectors and mattress foundation assemblies according to this invention are explained with reference to various exemplary embodiments of mattress foundation corner connectors and/or mattress foundation assemblies according to this invention. The basic explanation of the design factors and operating principles of the mattress foundation corner connectors and mattress foundation assemblies is applicable for the understanding, design, and operation of the mattress foundation corner connectors and mattress foundation assemblies of this invention. It should be appreciated that the mattress foundation corner connectors and/or the mattress foundation assemblies can be adapted to many applications where a simplified corner connector and/or a foundation assembly is needed.

It should also be appreciated that the terms "mattress foundation", "mattress foundation assembly", and "corner connector" are used for basic explanation and understanding of the operation of the systems, methods, and apparatuses of this invention. Therefore, the terms "mattress foundation", "mattress foundation assembly", and "corner connector" are not to be construed as limiting the systems, methods, and apparatuses of this invention. Thus, the terms "mattress foundation" and "mattress foundation assembly" are to be understood to broadly include any structures or devices capable of supporting a load, while the term "corner connector" is to be understood to broadly include any structure or device capable of joining two elements at a given angle.

Turning now to the drawing Figs., FIGS. 1-10 show a first exemplary embodiment of a corner connector element 105 according to this invention. In an illustrative, non-limiting embodiment of this invention, as illustrated in FIGS. 1-10, the corner connector element 105 comprises at least some of a main body portion 110, a deck panel support surface 115, a first side surface 121, a second side surface 122, a radiused surface 130, a first abutment surface 131, a second abutment surface 132, a deck panel corner abutment surface 136, a corner 139, and a bottom surface 140.

As illustrated in FIGS. 1-10, the main body portion 110 extends from the substantially planar bottom surface 140 to the substantially planar deck panel support surface 115.

The first side surface 121 and the second side surface 122 are substantially planar and are formed at substantially 90° relative to one another. One or more optional attachment apertures 118 may be formed in or through the deck panel support surface 115, the first side surface 121, and/or the second side surface 122. If included, the one or more optional attachment apertures 118 may be sized so as to allow a fasteners, such as, for example, a screw, to more easily attach to the corner connector element 105.

The first abutment surface 131 extends substantially perpendicularly from a terminating edge of the first side surface 121. Likewise, the second abutment surface 132 extends substantially perpendicularly from a terminating edge of the second side surface 122. The radiused surface 130 extends from a terminating edge of the first abutment surface 131 to a terminating edge of the second abutment surface 132.

A first portion of the first abutment surface 131 and the second abutment surface 132 extend above the deck panel support surface 115, while a second portion of the first abutment surface 131 and the second abutment surface 132 terminates at the deck panel support surface 115.

In various exemplary embodiments, as illustrated in FIGS. 1-10, an interior portion of the main body portion 110, wherein the interior portion is defined substantially between the bottom surface 140, the deck panel support surface 115, the first side surface 121, and the second side surface 122, is at least partially hollow. In these exemplary embodiments, one or more strengthening ribs 155 may optionally be formed within the hollow portion 150 of the interior portion. The one or more strengthening ribs 155 may provide additional strength and/or rigidity to the main body portion 110.

In various exemplary embodiments, the deck panel corner abutment surface 136 extends substantially perpendicularly from a terminating edge of the deck panel support surface 115.

The corner 139 is defined by the deck panel corner abutment surface 136. In various exemplary embodiments, the deck panel corner abutment surface 136 is a curved surface.

One or more protrusions 135 extend perpendicularly from the first abutment surface 131 and the second abutment surface 132. As illustrated in FIGS. 1-10, the corner connector element 105 includes three protrusions 135 extending from the first abutment surface 131 and three protrusions 135 extending from the second abutment surface 132. It should be appreciated that the number of protrusions 135 is a design choice based on the desired appearance and functionality of the corner connector element 105.

The protrusions 135 are formed so as to be aligned with and positioned within appropriately sized, mating recesses formed in the first header element 161, the second header element 162, the first side rail element 171, and the second side rail element 172. In this manner, the appropriate corner connector element 105 can be more readily aligned with the appropriate header element 161 or 162 and/or side rail element 171 or 172 when the mattress foundation assembly 100 is assembled.

In various exemplary embodiments, as illustrated in FIGS. 1-10, one or more recesses 133 are optionally formed in the first abutment surface 131 in an area between the protrusions 135. The one or more recesses 133 may provide additional strength and/or rigidity to the first abutment surface 131.

In various exemplary embodiments, the corner connector element 105 is substantially rigid and is formed of a polymeric material such as a polymeric composite. Alternate materials of construction may include one or more of the following: wood, steel, aluminum, titanium, and/or other metals, as well as various alloys and composites thereof, glass-hardened polymers, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the corner connector element 105 is a design choice based on the desired appearance and functionality of the corner connector element 105.

It should be appreciated that the corner connector element 105 may be integrally formed. Alternatively, suitable materials can be used and sections are elements made independently and attached or coupled together, such as by adhesives, staples, screws, nails, or other fasteners, to form the corner connector element 105.

It should be understood that the overall size and shape of the corner connector element 105, and the various portions thereof, is a design choice based upon the desired functionality and/or appearance of the corner connector element 105. Additionally, it should be appreciated that the corner connector element 105 is formed such that multiple corner connector elements 105 may be positioned and used as each of the four corners of a mattress foundation assembly 100. Therefore, multiple corner connector elements do not have to be formed for a specific location at a specific corner of a mattress foundation assembly 100.

As illustrated in FIGS. 11-17, the corner connector element 105 may be used to construct a mattress foundation assembly 100. It should be appreciated that either corner connector elements 105, corner connector elements 205, or corner connector elements 305 may be used to construct the mattress foundation assembly 100.

As illustrated in FIGS. 11-17, the mattress foundation assembly 100 comprises at least some of a plurality of corner connector elements 105, a first header element 161 having a first header element groove 165, a second header element 162 having a second header element groove 166, a first side rail element 171 having a first side rail element receiving groove 175, a second side rail element 172 having a second side rail element receiving groove 176, a first support rib 181 having a first support rib half-lap joint 185, a second support rib 182 having a second support rib half-lap joint 186, a spine element 190 having a spine element half-lap joint 196, and a top deck panel 198.

The first header element 161, the second header element 162, the first side rail element 171, and the second side rail element 172 each include one or more recesses 137 formed in each end. It should be understood that each of the one or more recesses 137 is formed so as to allow one of the protrusions 135 of the corner connector elements 105 to be positioned within the recess 137. Thus, for example, if the corner connector element 105 includes three protrusions 135, three mating recesses 137 will be formed in each end of the first header element 161, the second header element 162, the first side rail element 171, and the second side rail element 172.

In order to construct a mattress foundation assembly 100, four corner connector elements 105 are positioned at locations proximate the four corners of the finished mattress foundation assembly 100.

When properly positioned, the header elements 161 and 162 and the side rail elements 171 and 172 are each guided, by the interaction of the protrusions 135 and the recesses 137, so that the end surface of the header elements 161 and 162 and the side rail elements 171 and 172 contacts an appropriate first abutment surface 131 or second abutment surface 132, and an inner surface of the header elements 161 and 162 and the side rail elements 171 and 172 contacts an appropriate first side surface 121 or second side surface 122.

Figure 13:
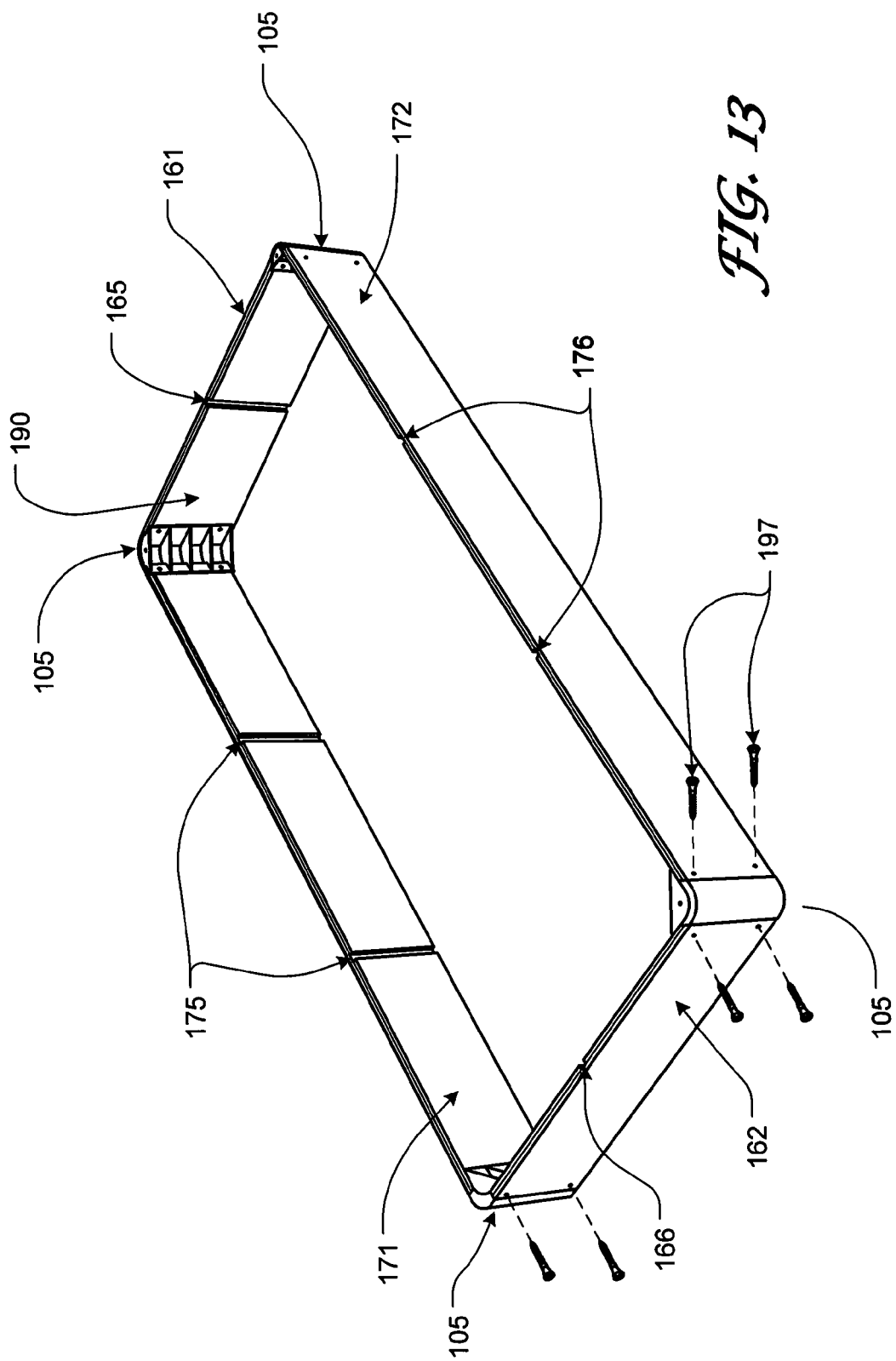
FIG. 13 shows a perspective view of a partially assembled mattress foundation assembly according to this invention.

Then, as illustrated in FIG. 13, the first header element 161, second header element 162, first side rail element 171, and second side rail element 172 are each attached or coupled, at their appropriate ends, to an appropriately corresponding corner connector element 105.

In various exemplary embodiments, the various header and rail elements may be coupled, via fastening elements or means, such as, for example, screws 197, to the corner connector elements 105. Alternatively, the various header and rail elements may be secured to the corner connector elements 105 via an adhesive.

Each of the first header element 161, the second header element 162, the first side rail element 171, and the second side rail element 172 has at least one groove formed on an interior side of the element, perpendicular to the longitudinal axis of the element. These one or more grooves are formed so as to accept at least a portion of a support rib or spine element, as described below.

Due to the shape and placement of the first side surface 121, the second side surface 122, the first abutment surface 131, and the second abutment surface 132, so long as the first header element 161 and the second header element 162 are of an equal length and the first side rail element 171 and the second side rail element 172 are of an equal length, and so long as each of the elements 161, 162, 171, and 172 has a terminating end that is parallel and perpendicular to the longitudinal axis of the element and a planar portion, on an interior side of the element, proximate the terminating end of the element, which is parallel and perpendicular to the longitudinal axis of the element, when the interior side of the element is positioned against a corresponding first side surface 121 or the second side surface 122 of a corner connector element 105 and the terminating end is positioned against a corresponding first abutment surface 131 or second abutment surface 132, the first header element 161 and the second header element 162 will be parallel to one another and the first side rail element 171 and the second side rail element 172 will be parallel to one another.

Figure 12:
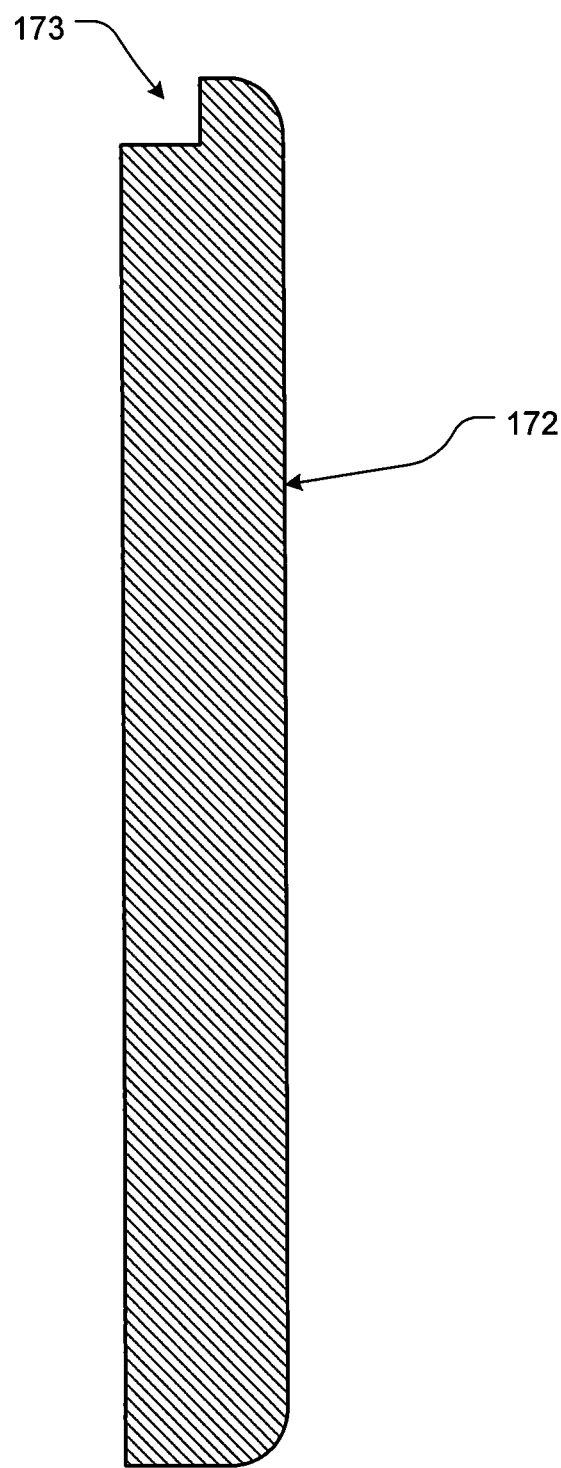
FIG. 12 shows a cross-sectional view of an exemplary side rail element according to this invention.

FIG. 12 shows a cross-sectional view of an exemplary side rail element or header element according to this invention. As illustrated most clearly in FIG. 12, each of the first header element 161, the second header element 162, the first side rail element 171, and the second side rail element 172 includes a recessed notch 173 to accommodate a flush-mounted top deck panel 198.

Figure 14:
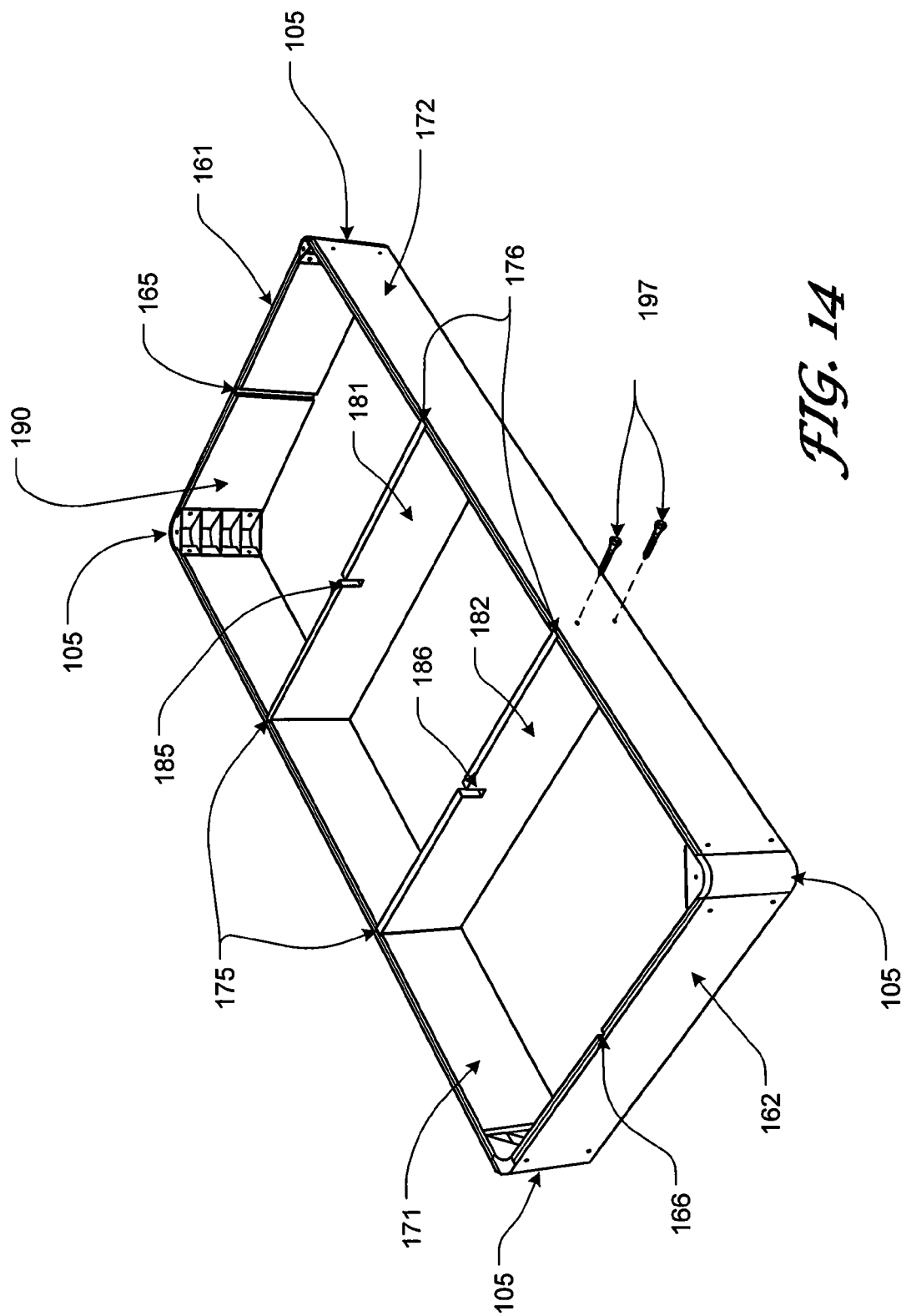
FIG. 14 shows a perspective view of a partially assembled mattress foundation assembly according to this invention.

Once each of the first header element 161, the second header element 162, the first side rail element 171, and the second side rail element 172 are attached, coupled, or secured to an appropriate corner connector element 105, as illustrated in FIG. 13, the first support rib 181 and the second support rib 182 can be positioned between the first side rail element 171 and the second side rail element 172, within corresponding first side rail element receiving grooves 175 and second side rail element receiving grooves 176, as illustrated in FIG. 14.

In various exemplary embodiments, the first support rib 181 and the second support rib 182 can be coupled, via fastening elements or means, such as, for example, screws 197, within the corresponding first side rail element receiving grooves 175 and second side rail element receiving grooves 176. Alternatively, the support ribs may be secured within receiving grooves via an adhesive.

Figure 15:
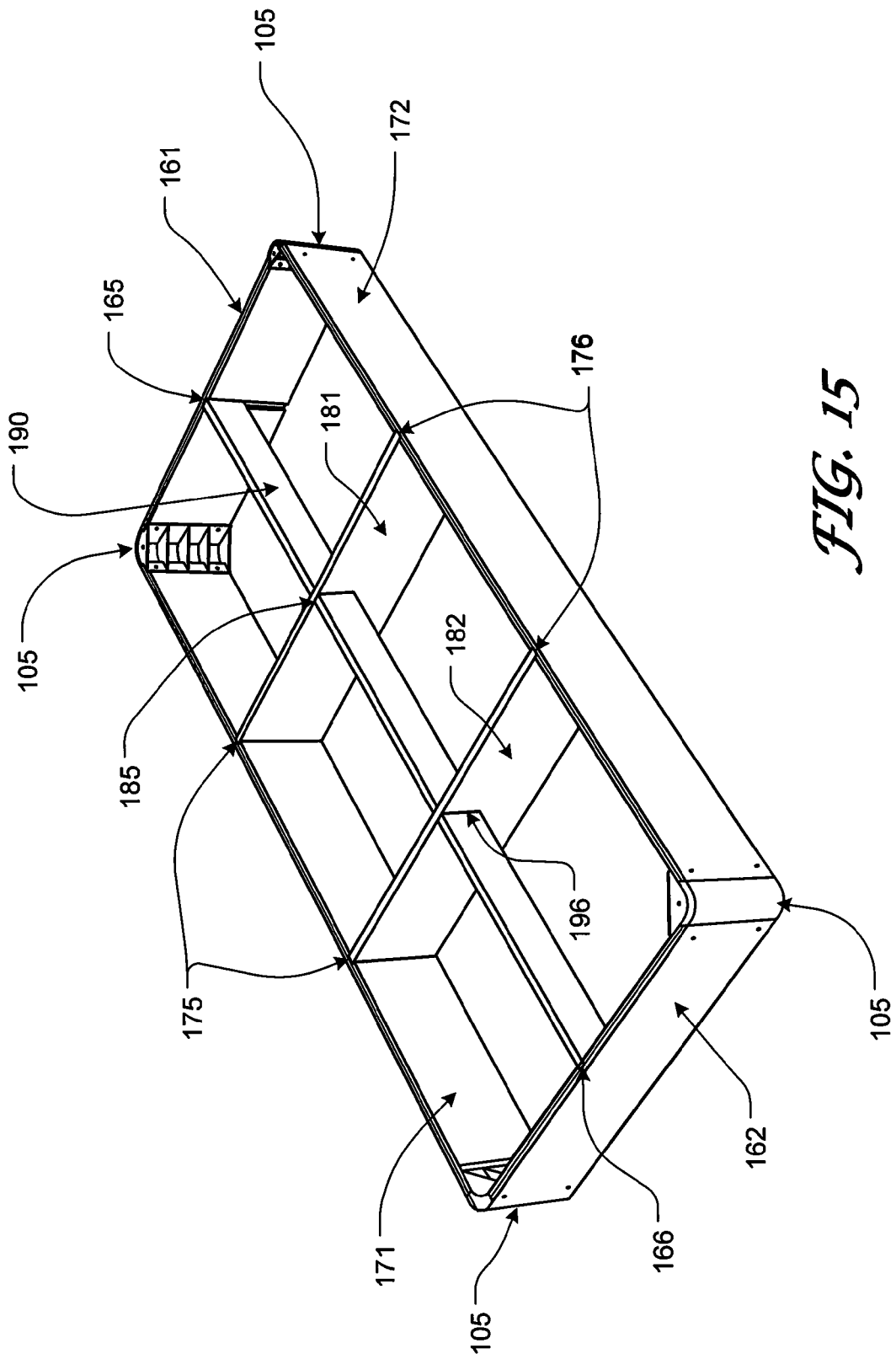
FIG. 15 shows a perspective view of a partially assembled mattress foundation assembly according to this invention.

Once each of the first support rib 181 and the second support rib 182 are attached, coupled, or secured within the corresponding receiving grooves 175 and 176, as illustrated in FIG. 14, the spine element 190 can be positioned between the first header element 161 and the second header element 162, within corresponding first header element groove 165 and second header element groove 166, as illustrated in FIG. 15.

As further illustrated in FIG. 15, because the first support rib half-lap joint 185 and the second support rib half-lap joint 186 are formed to mate with the spine element half-lap joints 196, when the spine element 190 is positioned between the first header element 161 and the second header element 162, the first support rib half-lap joint 185 and the second support rib half-lap joint 186 align with the spine element half-lap joints 196 to allow a top surface of the spine element 190 to be flush with a top surface of the first header element 161 and the second header element 162.

In various exemplary embodiments, the spine element 190 can be coupled, via fastening elements or means, such as, for example, screws (not shown), within the corresponding grooves 165 and 166. Alternatively, the support ribs may be secured within the grooves via an adhesive.

It should be appreciated that the number of spine elements 190, first support ribs 181, and second support ribs 182 is a design choice based upon the desired functionality, rigidity, and/or strength of the mattress foundation is simply 100.

Figure 16:
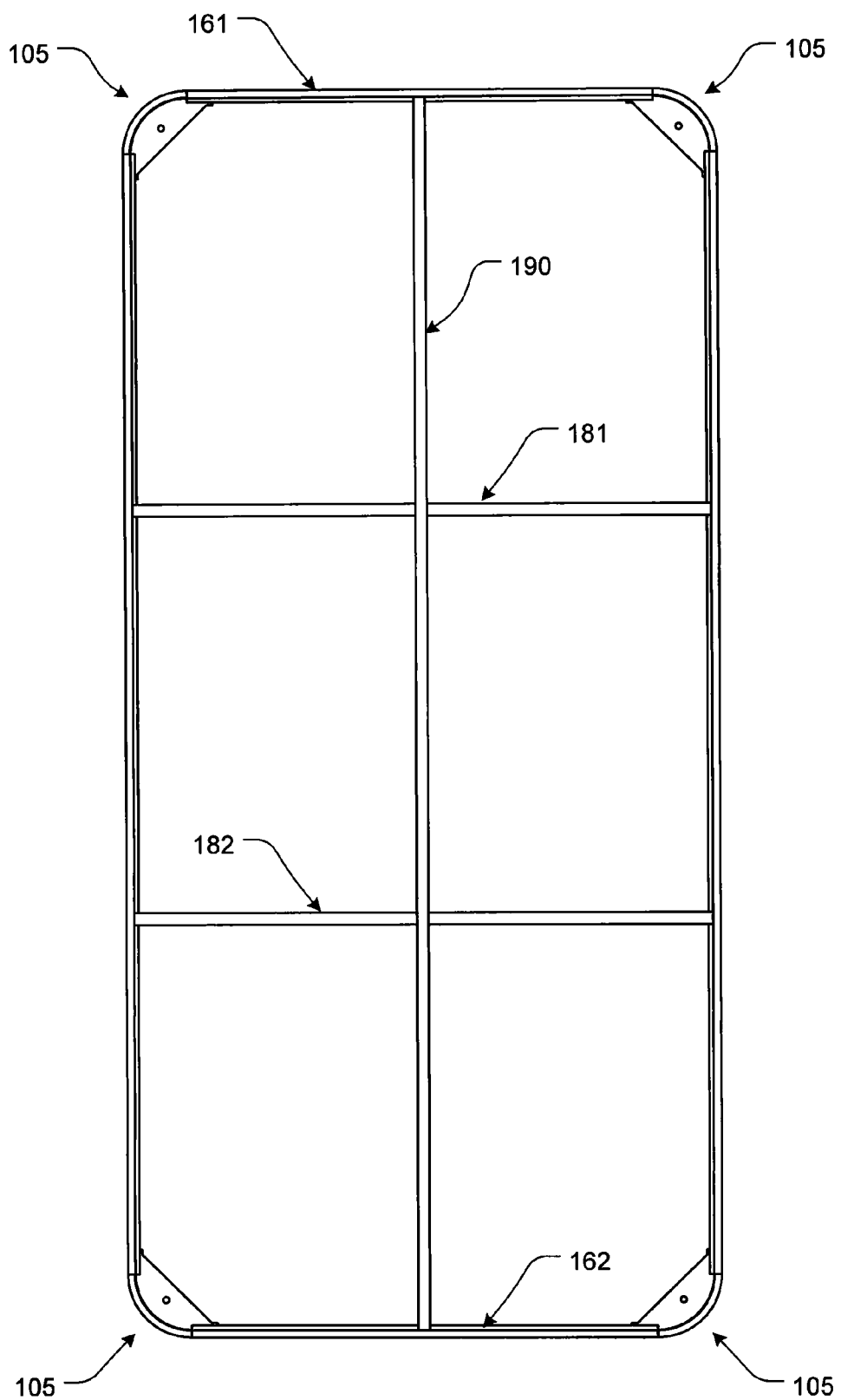
FIG. 16 shows a top view of a partially assembled mattress foundation assembly according to this invention.

FIG. 16 shows a top view of a partially assembled mattress foundation is assembly 100, wherein the top deck panel 198 has not yet been added to the assembly 100.

Figure 17:
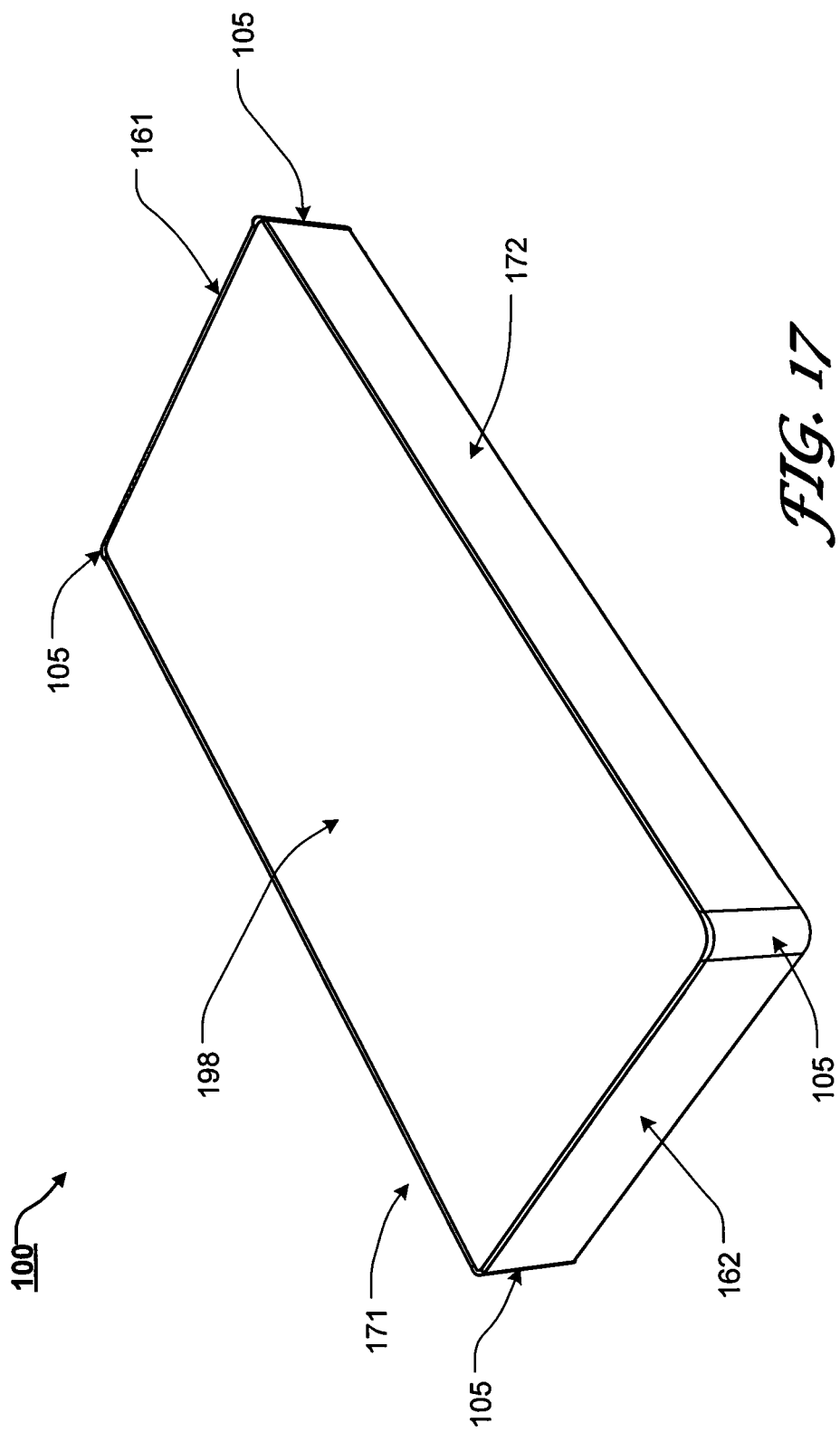
FIG. 17 shows a perspective view of an assembled mattress foundation assembly according to this invention.
Figure 18:
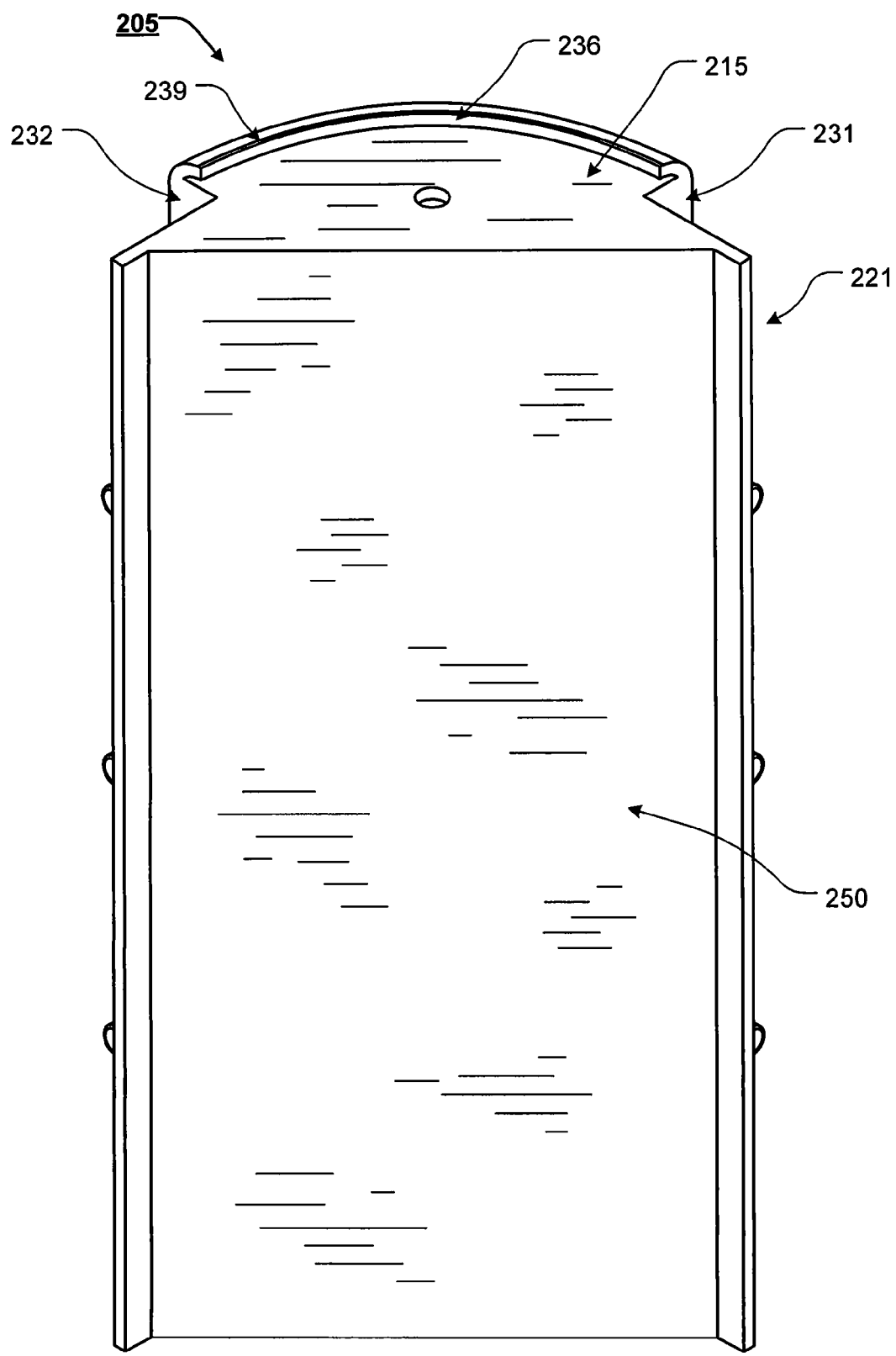
FIG. 18 is an isometric view of a second exemplary embodiment of a corner connector element according to this invention.
Figure 19:
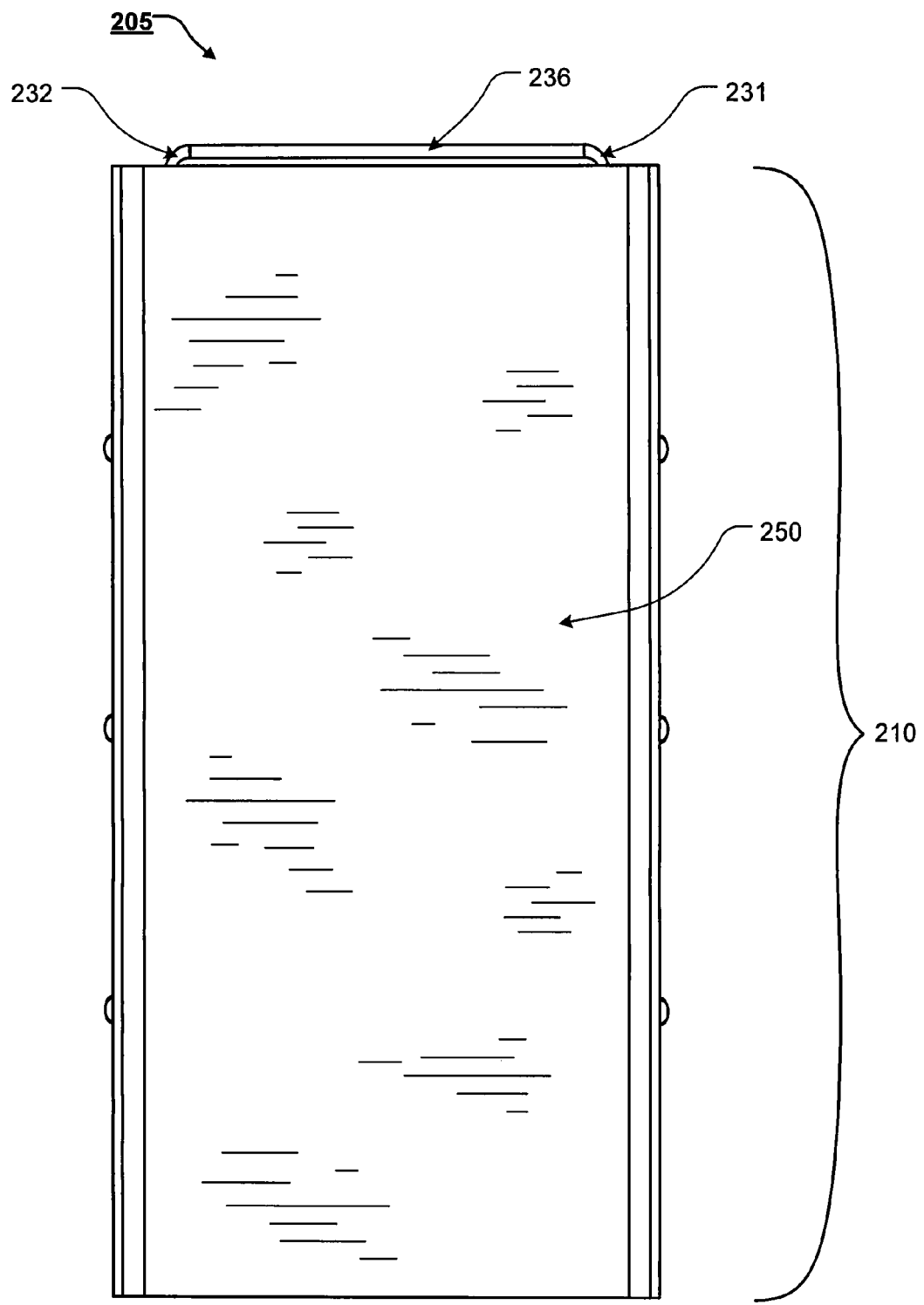
FIG. 19 is a front view of the second exemplary embodiment of a corner connector element according to this invention.
Figures 20, 21:
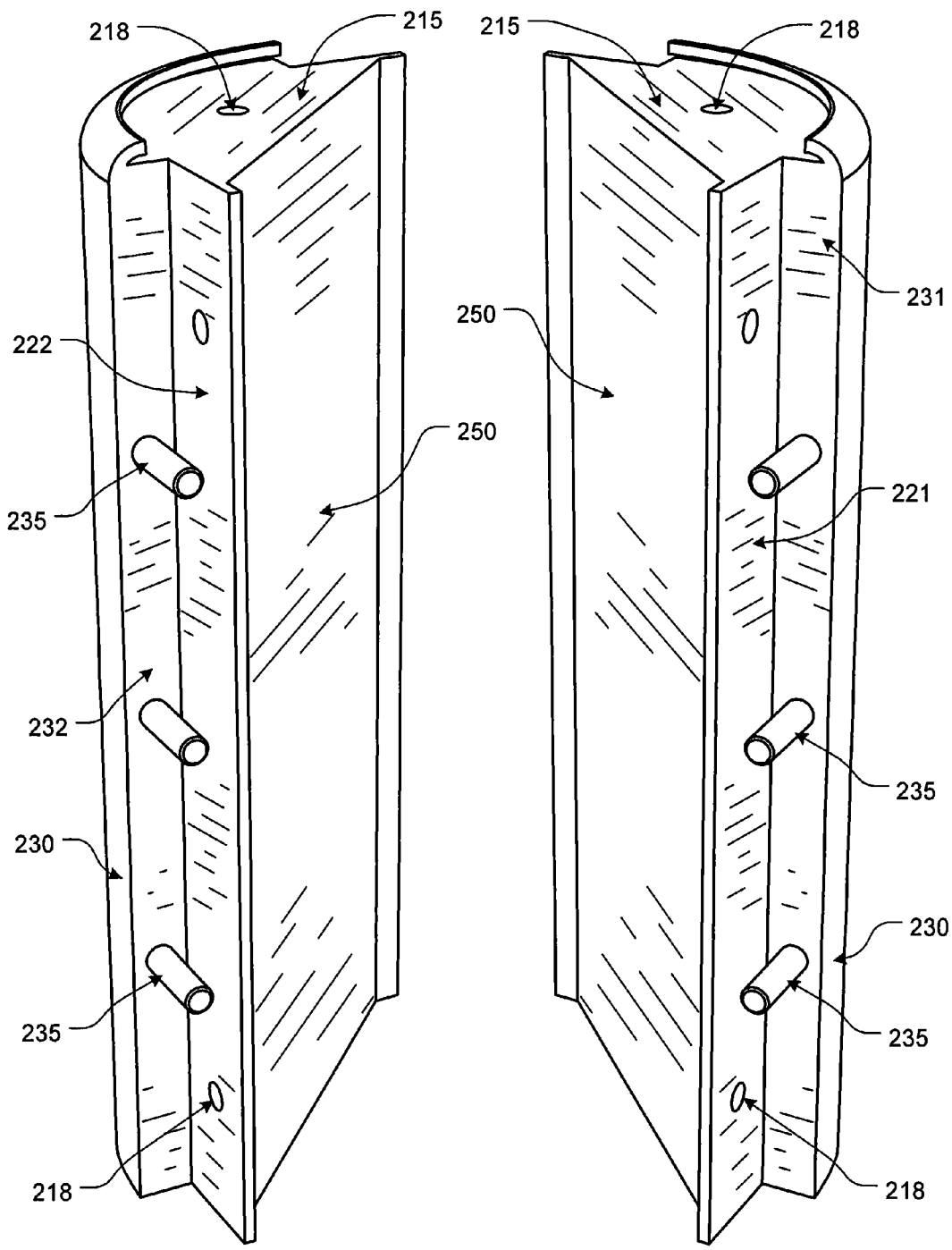
FIG. 20 is a left perspective view of the second exemplary of a corner connector element according to this invention thereof.
FIG. 21 is a right perspective view of the second exemplary of a corner connector element according to this invention thereof.
Figures 22, 23:
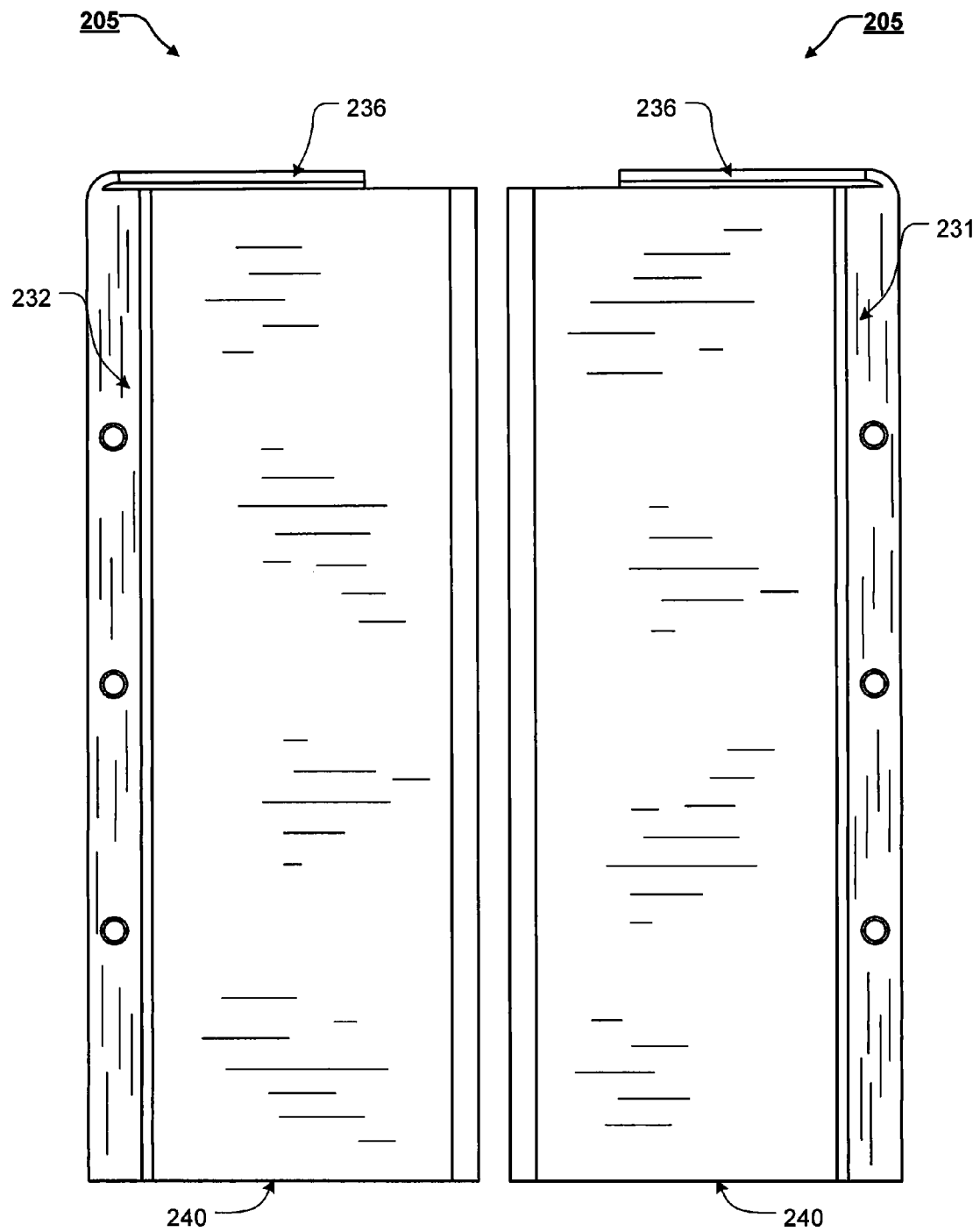
FIG. 22 is a left view of the second exemplary embodiment of a corner connector element according to this invention.
FIG. 23 is a right view of the second exemplary embodiment of a corner connector element according to this invention.
Figure 24:
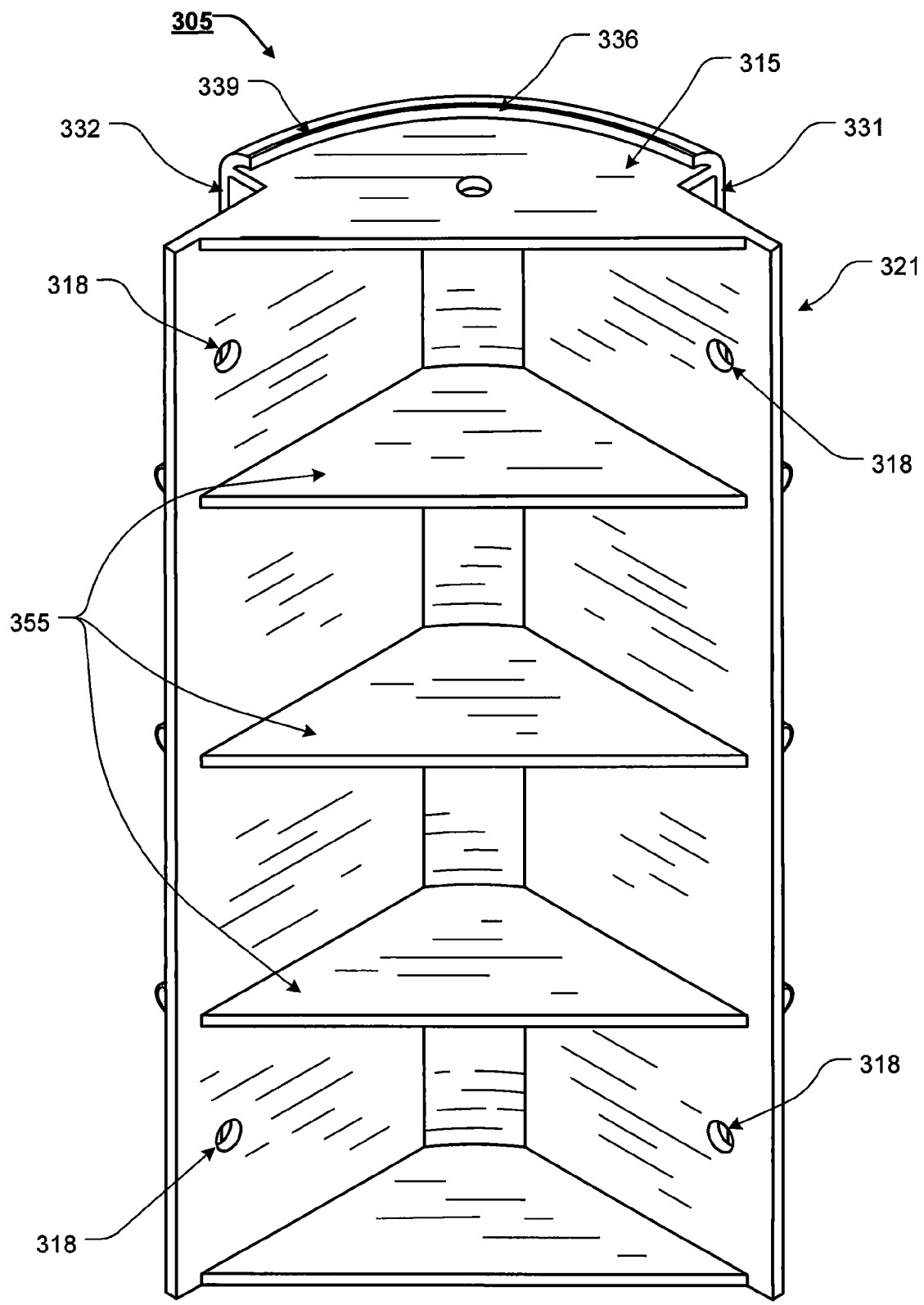
FIG. 24 is an isometric view of a third exemplary embodiment of a corner connector element according to this invention.
Figure 25:
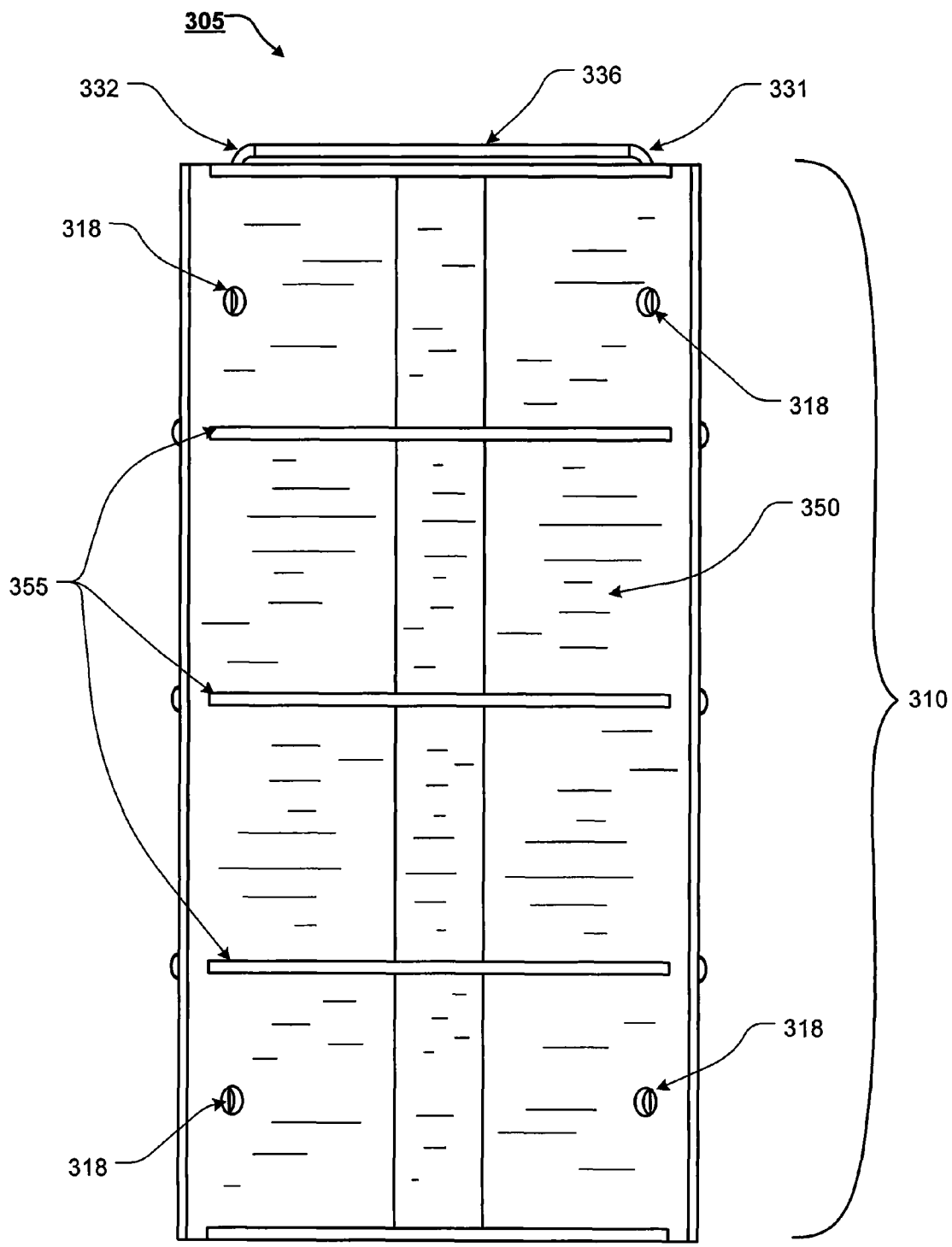
FIG. 25 is a front view of the third exemplary embodiment of a corner connector element according to this invention.
Figures 28, 29:
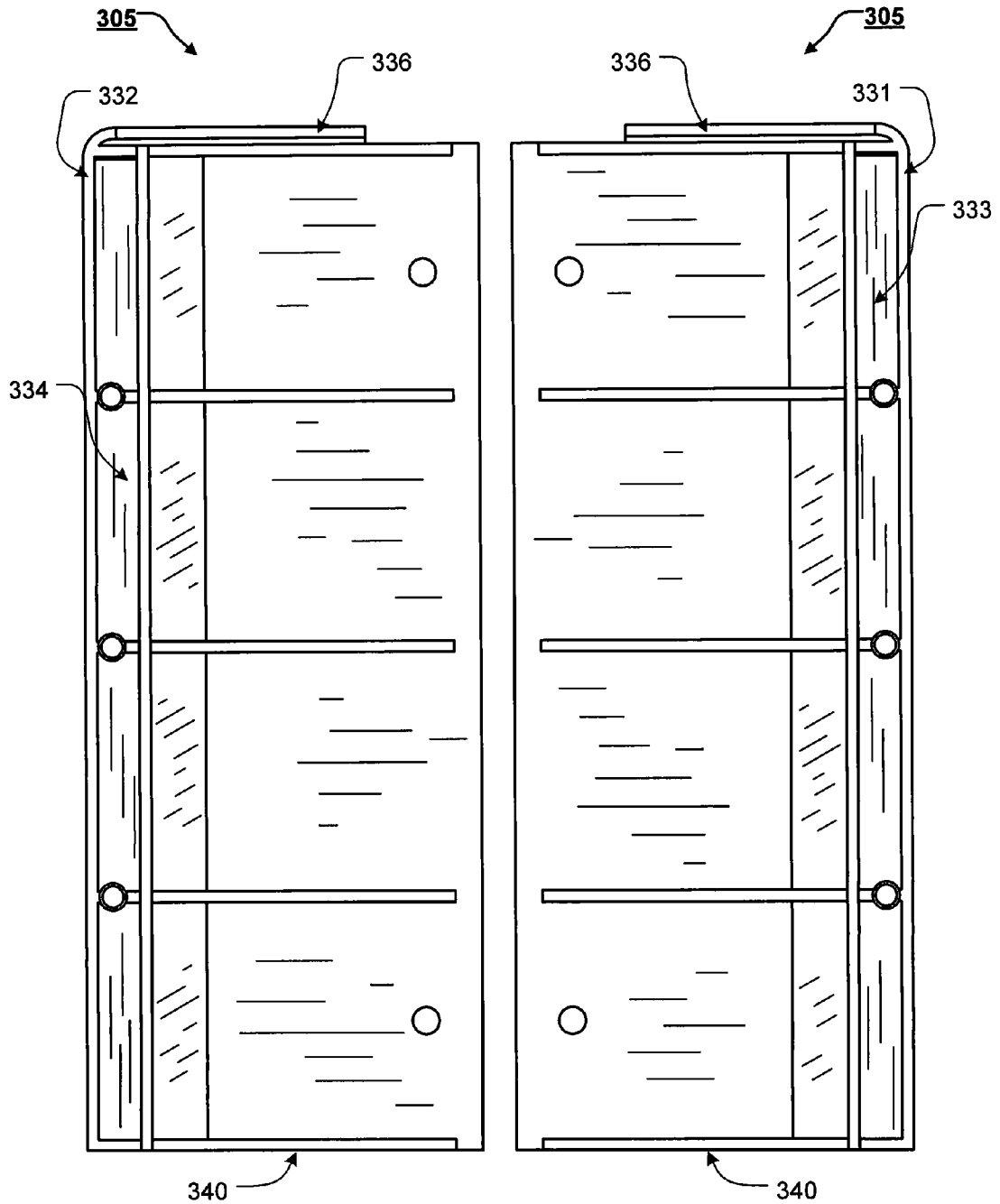
FIG. 28 is a left view of the third exemplary embodiment of a corner connector element according to this invention.
FIG. 29 is a right view of the third exemplary embodiment of a corner connector element according to this invention.
Figure 30:
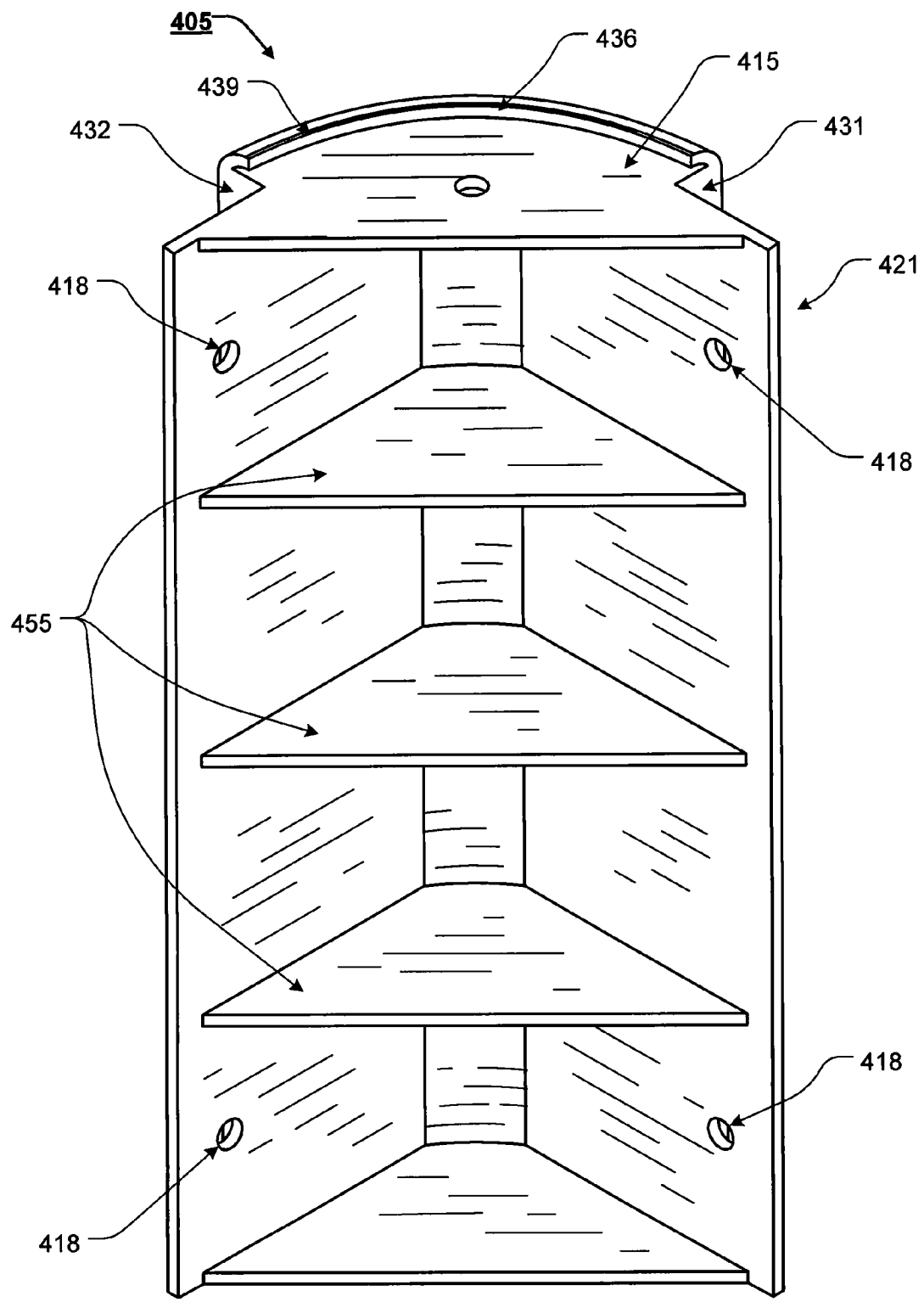
FIG. 30 is an isometric view of a forth exemplary embodiment of a corner connector element according to this invention.
Figure 31:
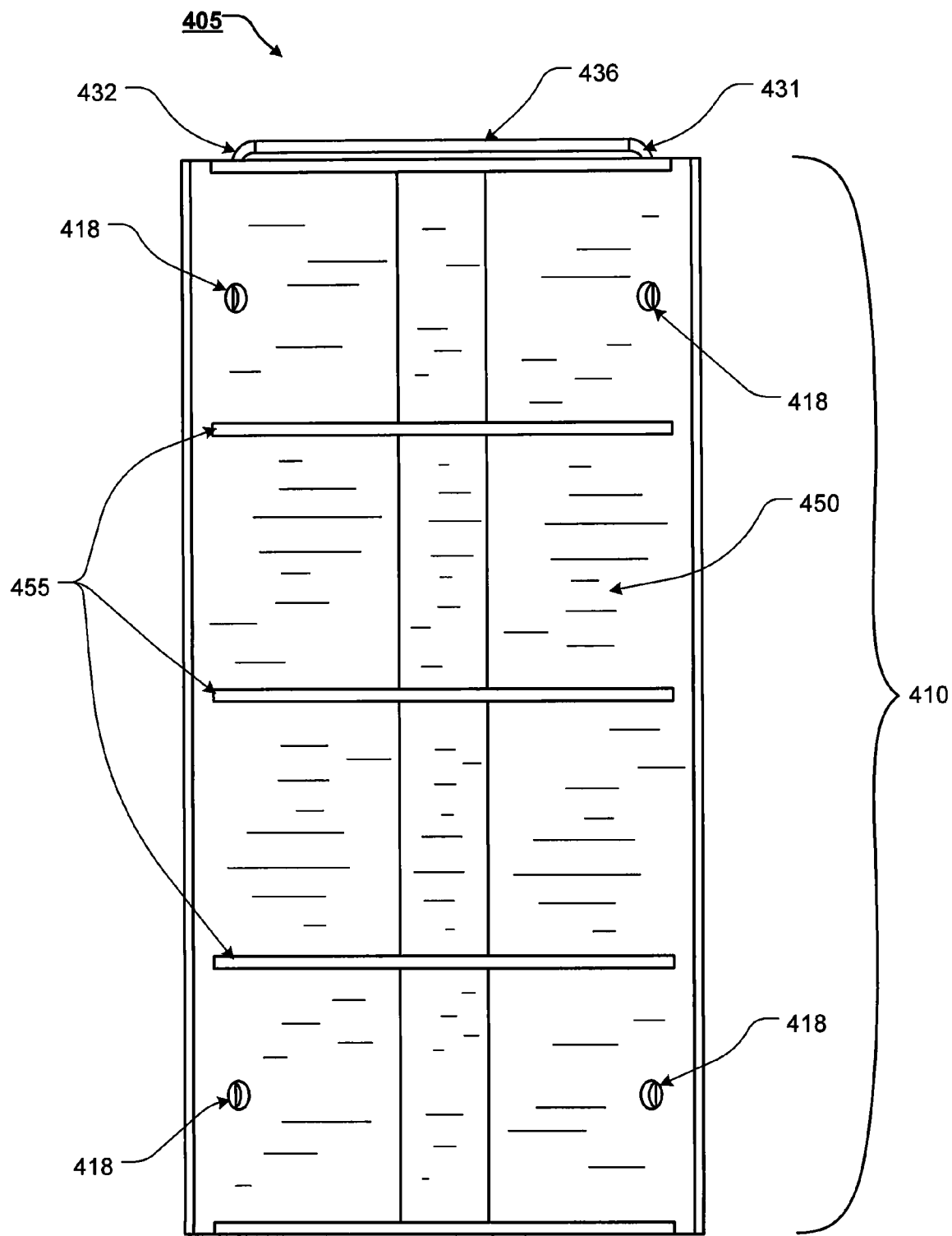
FIG. 31 is a front view of the forth exemplary embodiment of a corner connector element according to this invention.
Figures 32, 33:
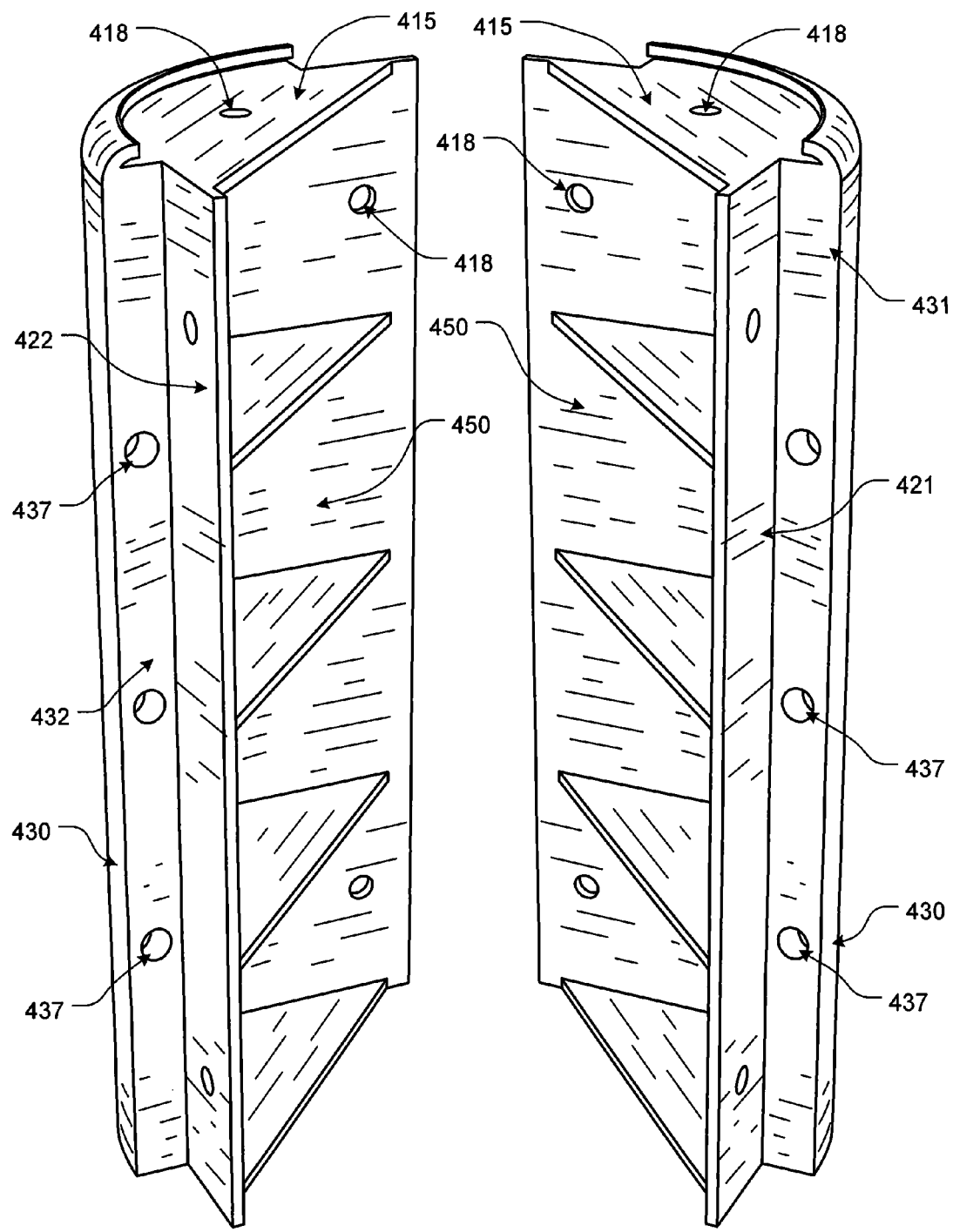
FIG. 32 is a left perspective view of the forth exemplary embodiment of a corner connector element according to this invention.
FIG. 33 is a right perspective view of the forth exemplary embodiment of a corner connector element according to this invention.
Figure 34:
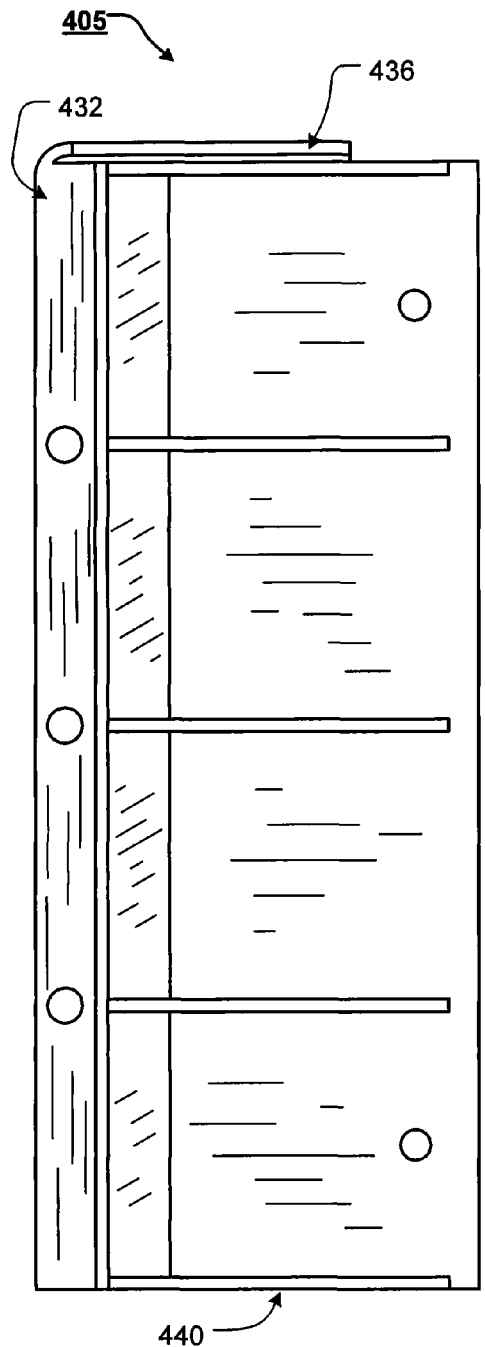
FIG. 34 is a left view of the forth exemplary embodiment of a corner connector element according to this invention.
Figure 35:
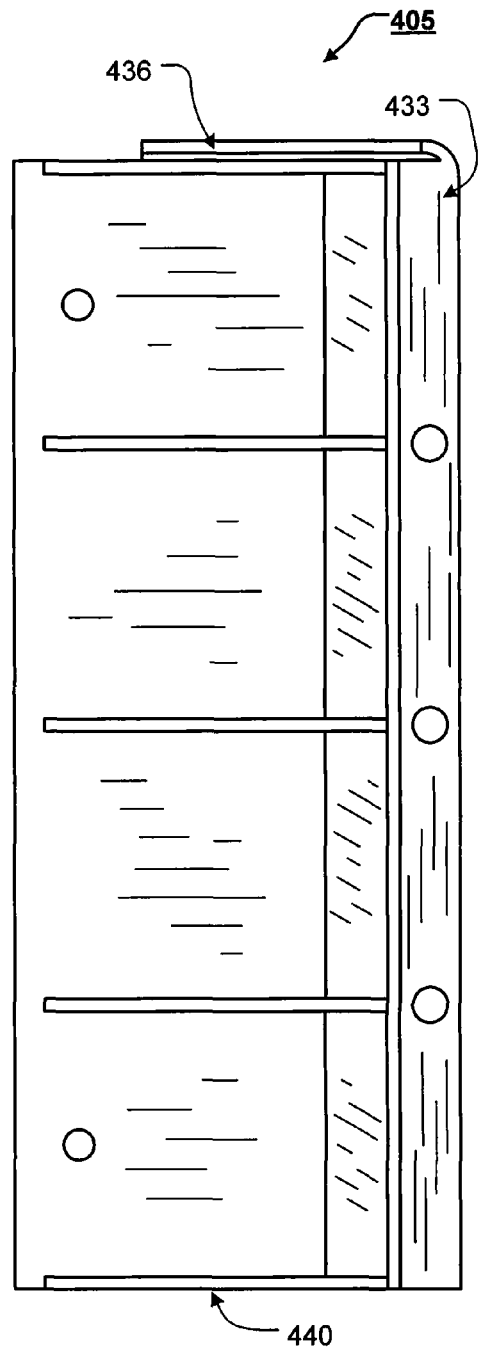
FIG. 35 is a right view of the forth exemplary embodiment of a corner connector element according to this invention.
Figure 36:
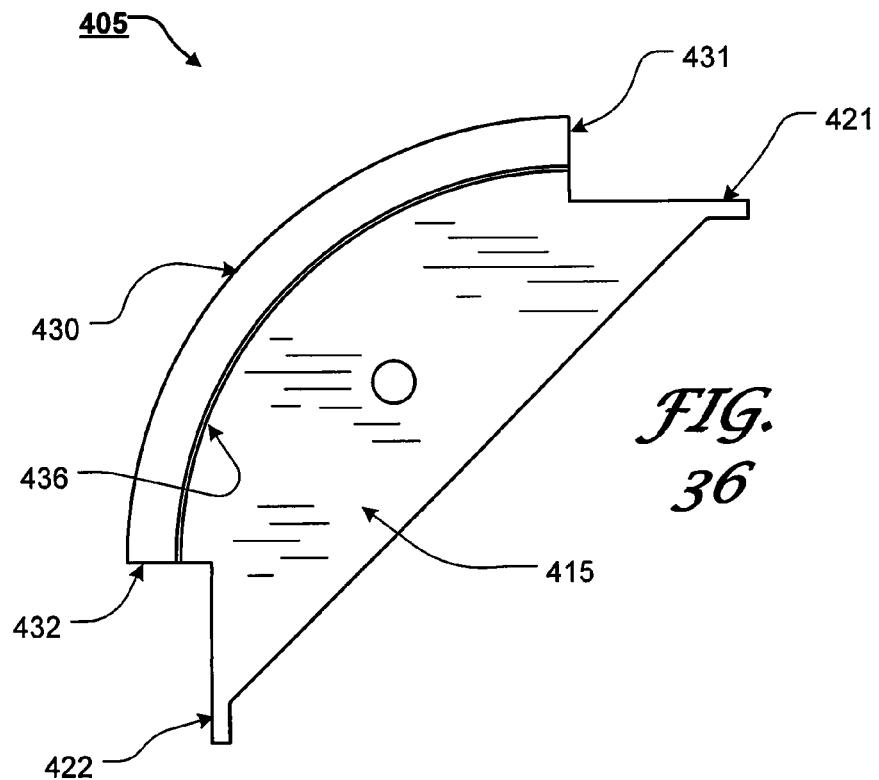
FIG. 36 is a top plan view of the forth exemplary embodiment of a corner connector element according to this invention.
Figure 37:
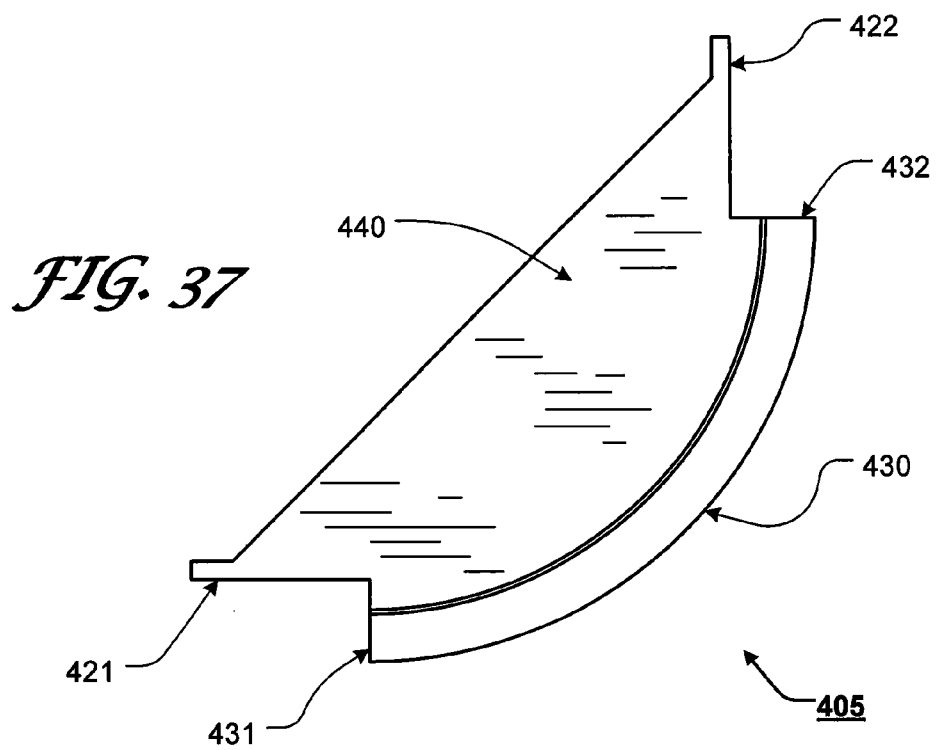
FIG. 37 is a bottom plan view of the forth exemplary embodiment of a corner connector element according to this invention.

Finally, as illustrated in FIG. 17, the top deck panel 198 can be placed atop the spine element 190, the first support rib 181 and the second support rib 182, within the recessed notch 173 of the first header element 161, the second header element 162, the first side rail element 171, and the second side rail element 172, so as to be flush-mounted with a top surface of the header elements 161 and 162 and the rail elements 171 and 172.

Once assembled, the mattress foundation assembly 100 can be placed in a bed frame (not shown) for receiving a mattress.

FIGS. 18-23 illustrate a second exemplary embodiment of a corner connector 205 according to this invention. As shown in FIGS. 18-23, the corner connector 205 includes at least some of a main body portion 210, a deck panel support surface 215, one or more attachment apertures 218, a first side surface 221, a second side surface 222, a radiused surface 230, a first abutment surface 231, a second abutment surface 232, protrusions 235, a deck panel corner abutment surface 236, a corner 239, and a bottom surface 240.

It should be understood that each of these elements corresponds to and operates similarly to the deck panel support surface 115, the one or more attachment apertures 118, the first side surface 121, the second side surface 122, the radiused surface 130, the first abutment surface 131, the second abutment surface 132, the protrusions 135, the deck panel corner abutment surface 136, the corner 139, and the bottom surface 140, as described above with reference to the corner connector element 105 of FIGS. 1-10.

However, as shown in FIGS. 18-23, the hollow portion 150 of the corner connector element 105 is not included and the main body portion 210 is solid, having a surface 250. It should be appreciated that the surface 250 may be substantially planar, concave, or convex.

Additionally, as illustrated in FIGS. 18-23, the one or more recesses 133 formed in the first abutment surface 131 of the corner connector element 105 of FIGS. 1-10 are not included.

FIGS. 24-29 illustrate a third exemplary embodiment of a corner connector 305 according to this invention. As shown in FIGS. 24-29, the corner connector 305 includes at least some of a main body portion 310, a deck panel support surface 315, one or more attachment apertures 318, a first side surface 321, a second side surface 322, a radiused surface 330, a first abutment surface 331, a second abutment surface 332, protrusions 335, a deck panel corner abutment surface 336, a corner 339, and a bottom surface 340.

It should be understood that each of these elements corresponds to and operates similarly to the deck panel support surface 115, the one or more attachment apertures 118, the first side surface 121, the second side surface 122, the radiused surface 130, the first abutment surface 131, the second abutment surface 132, the protrusions 135, the deck panel corner abutment surface 136, the corner 139, and the bottom surface 140, as described above with reference to the corner connector element 105 of FIGS. 1-10.

However, as shown in FIGS. 24-29, in addition to the one or more recesses 333 that are formed in the first abutment surface 331 in an area between the protrusions 335, one or more similar recesses 334 are formed in the second abutment surface 332 in an area between the protrusions 335. The one or more recesses 333 and one or more recesses 334 may provide additional strength and/or rigidity to the first abutment surface 331 and the second abutment surface 332, respectively.

FIGS. 30-37 illustrate a fourth exemplary embodiment of a corner connector 405 according to this invention. As shown in FIGS. 30-37, the corner connector 405 includes at least some of a main body portion 410, a deck panel support surface 415, one or more attachment apertures 418, a first side surface 421, a second side surface 422, a radiused surface 430, a first abutment surface 431, a second abutment surface 432, a deck panel corner abutment surface 436, a corner 439, and a bottom surface 440.

It should be understood that each of these elements corresponds to and operates similarly to the deck panel support surface 115, the one or more attachment apertures 118, the first side surface 121, the second side surface 122, the radiused surface 130, the first abutment surface 131, the second abutment surface 132, the deck panel corner abutment surface 136, the corner 139, and the bottom surface 140, as described above with reference to the corner connector element 105 of FIGS. 1-10.

However, as shown in FIGS. 30-37, the protrusions 135 are replaced by one or more recesses 437 formed in the first abutment surface 431 and the second abutment surface 432.

Figure 38:
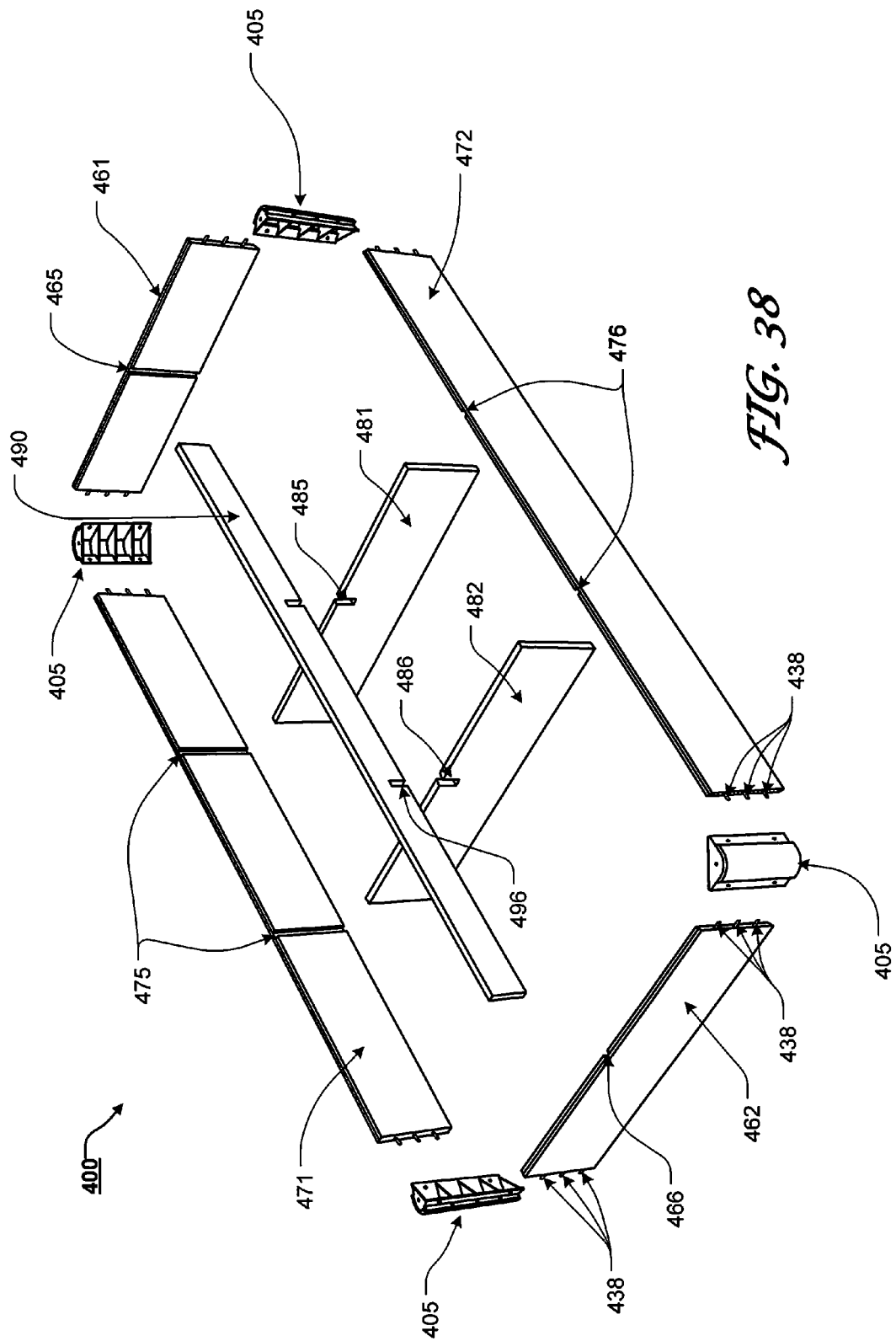
FIG. 38 shows an exploded perspective view of the fourth exemplary embodiment of certain of the components of a mattress foundation assembly according to this invention.
Figure 39:
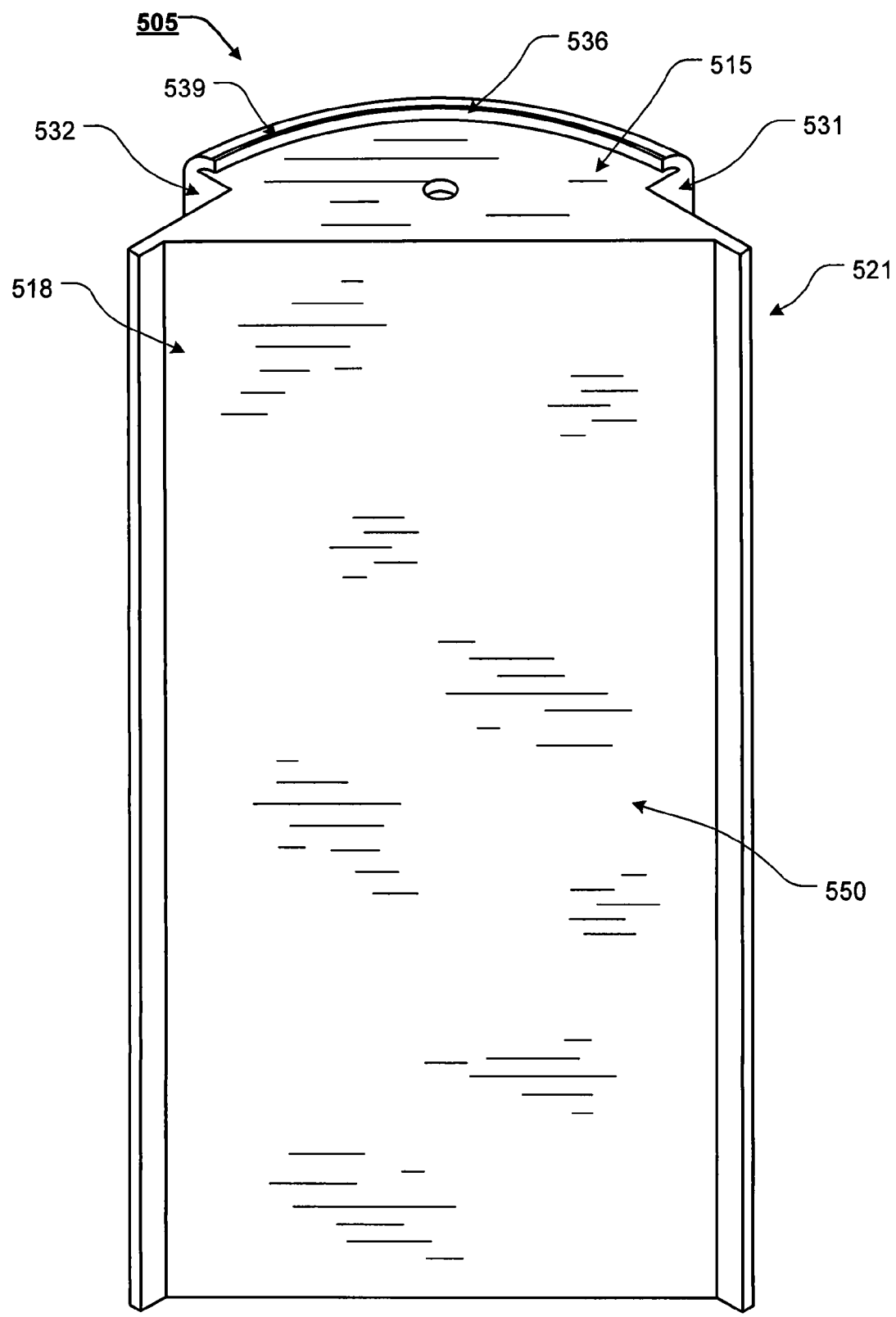
FIG. 39 is an isometric view of a fifth exemplary embodiment of a corner connector element according to this invention.
Figure 40:
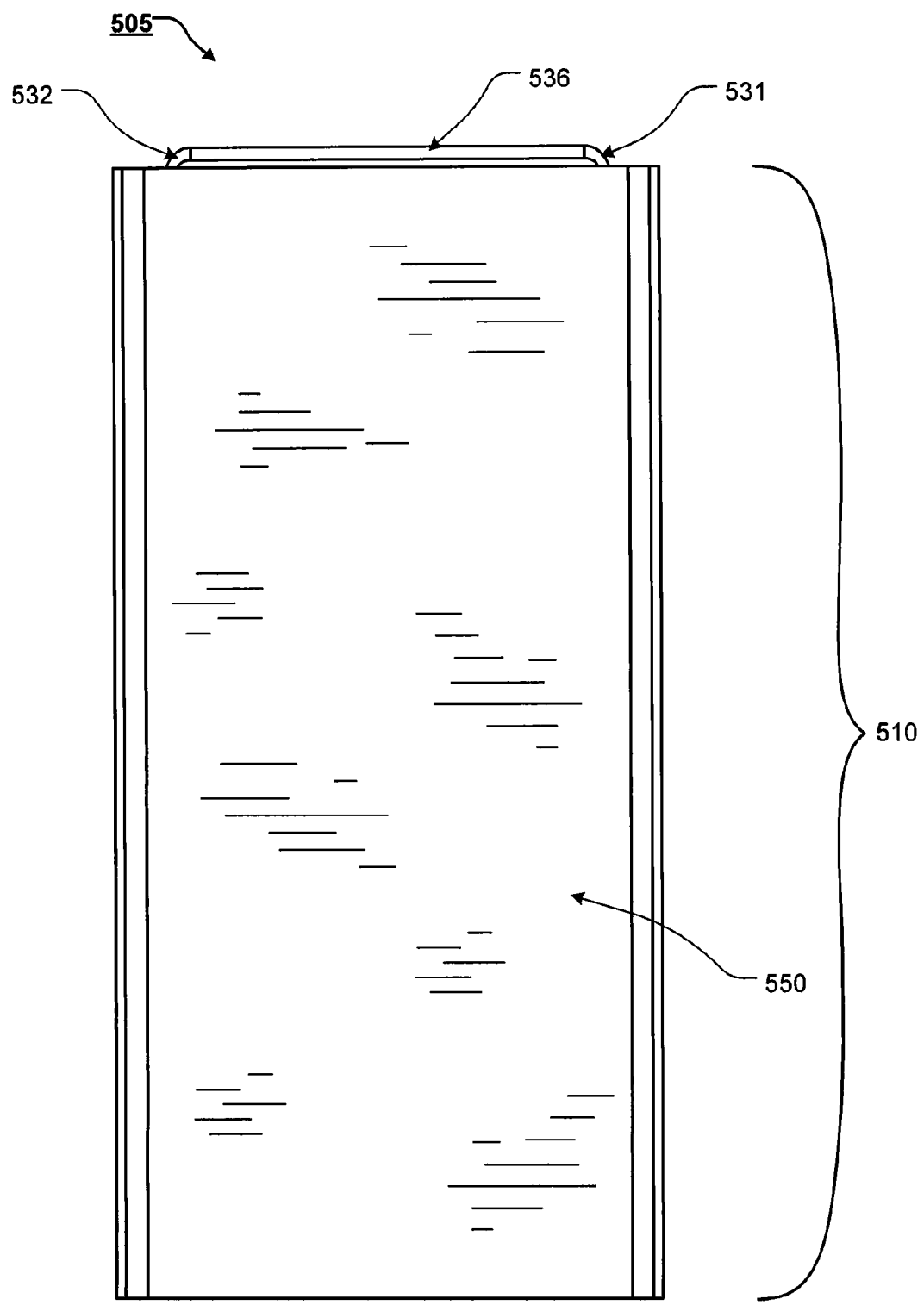
FIG. 40 is a front view of the fifth exemplary embodiment of a corner connector element according to this invention.
Figures 41, 42:
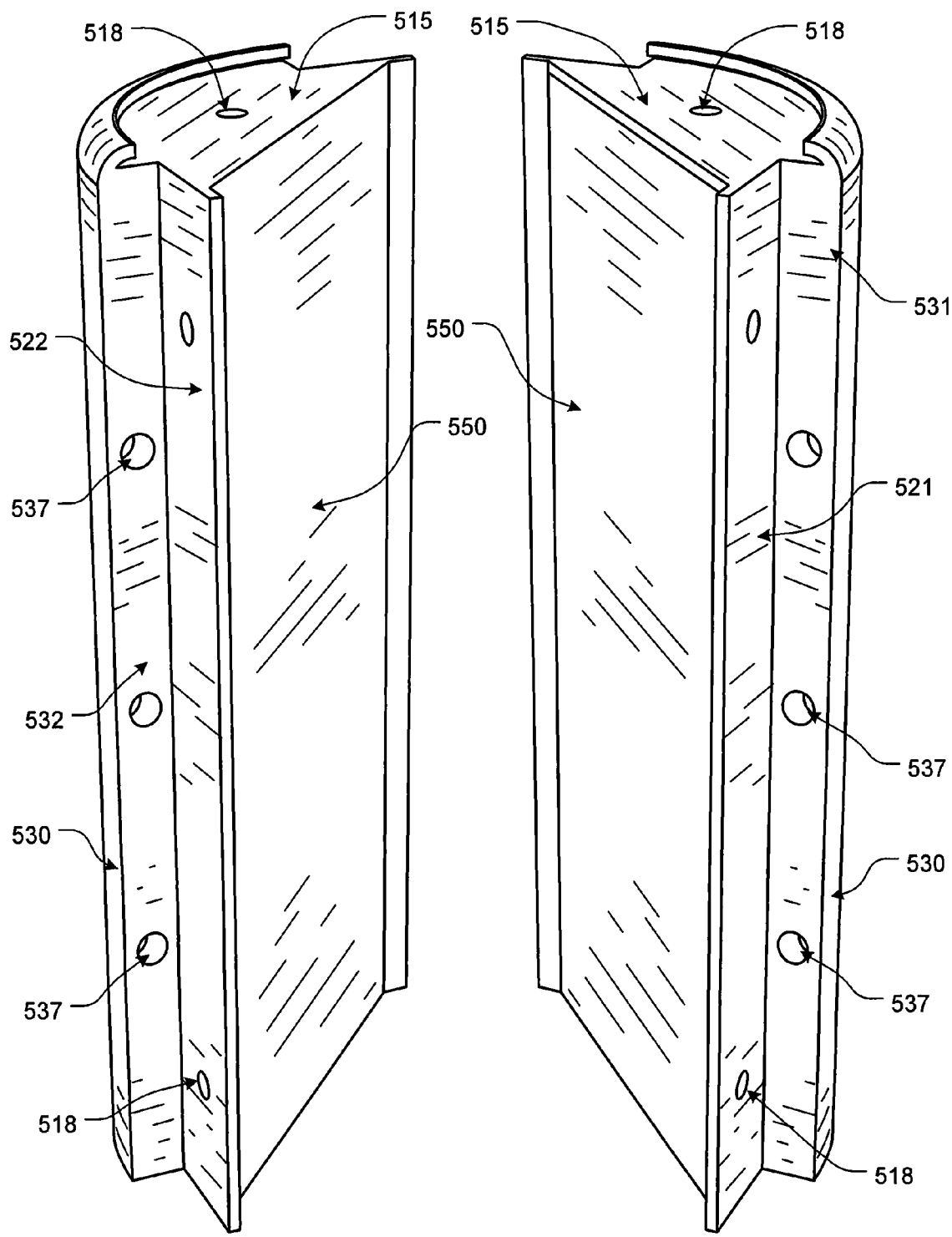
FIG. 41 is a left perspective view of the fifth exemplary embodiment of a corner connector element according to this invention.
FIG. 42 is a right perspective view of the fifth exemplary embodiment of a corner connector element according to this invention.
Figure 43:
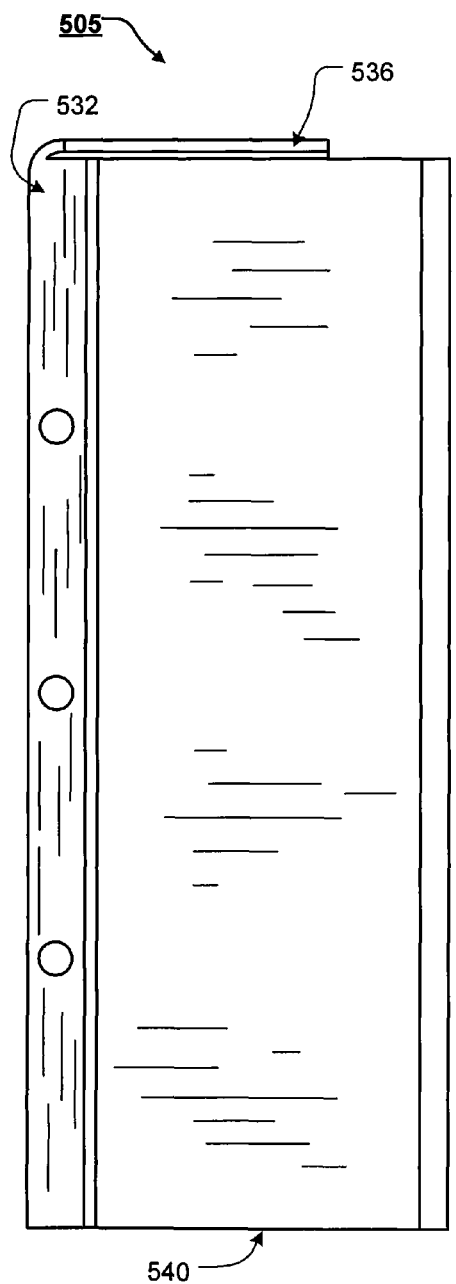
FIG. 43 is a left view of the fifth exemplary embodiment of a corner connector element according to this invention.
Figure 44:
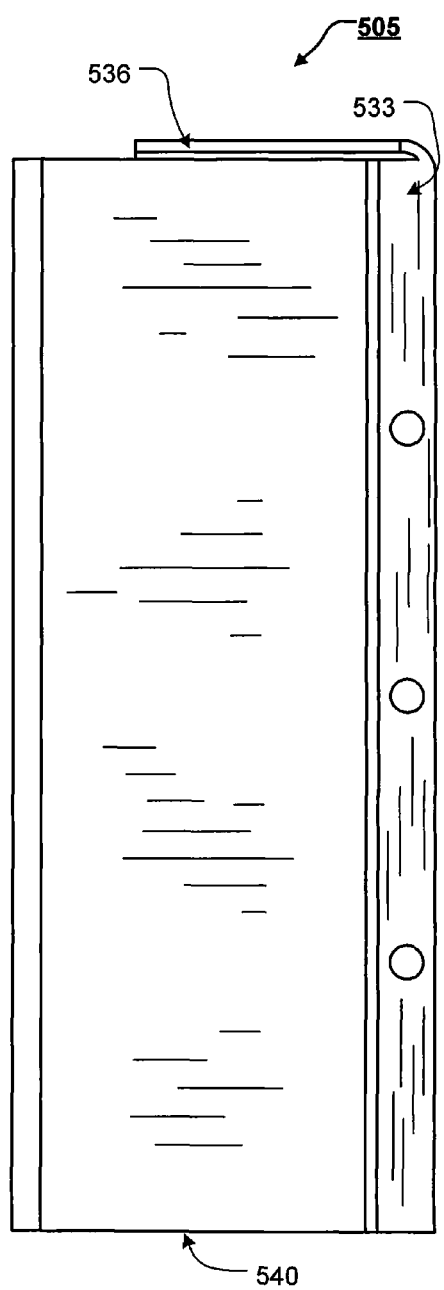
FIG. 44 is a right view of the fifth exemplary embodiment of a corner connector element according to this invention.
Figure 45:
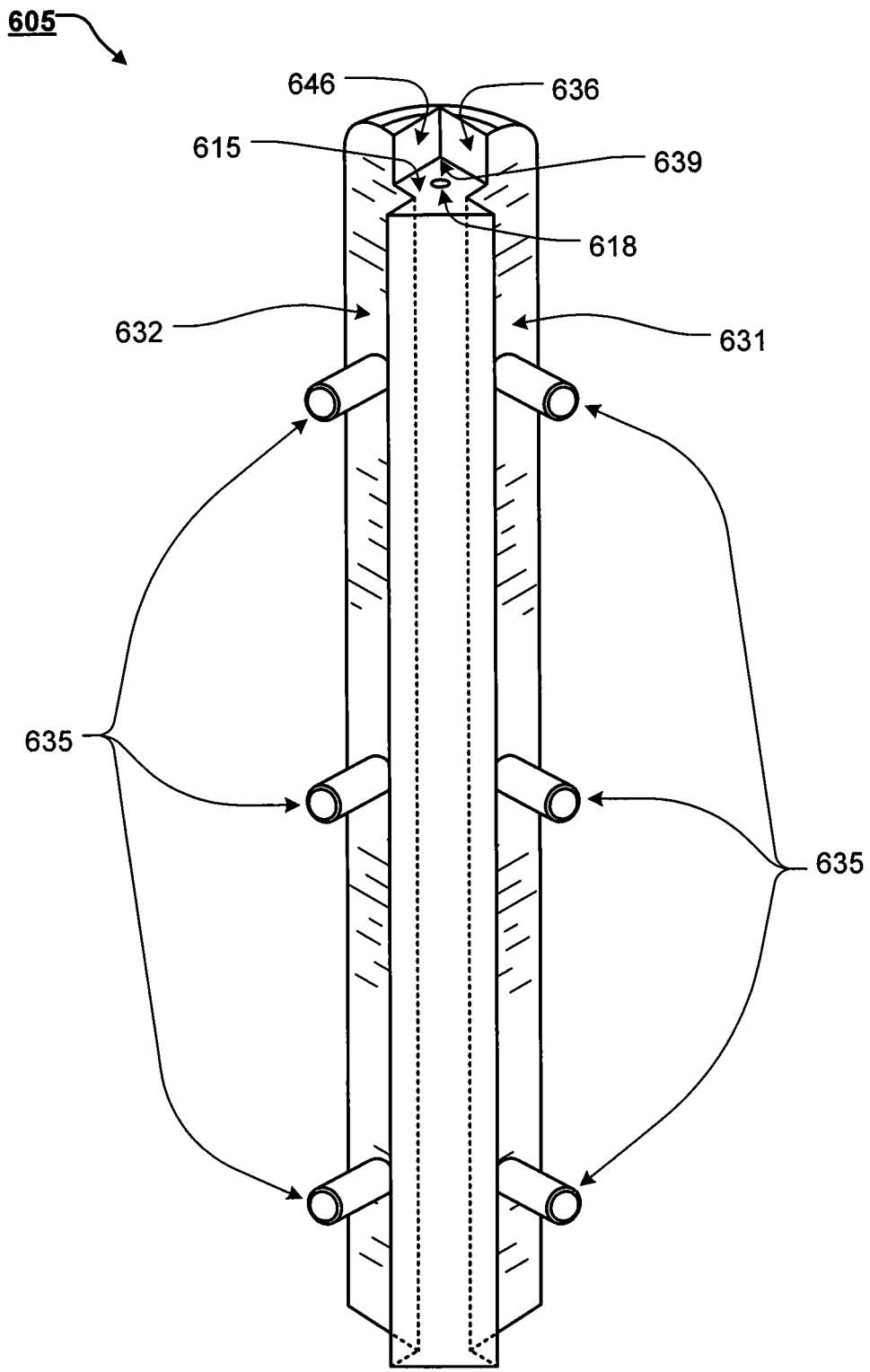
FIG. 45 is an isometric view of a sixth exemplary embodiment of a corner connector element according to this invention.
Figures 46, 47:
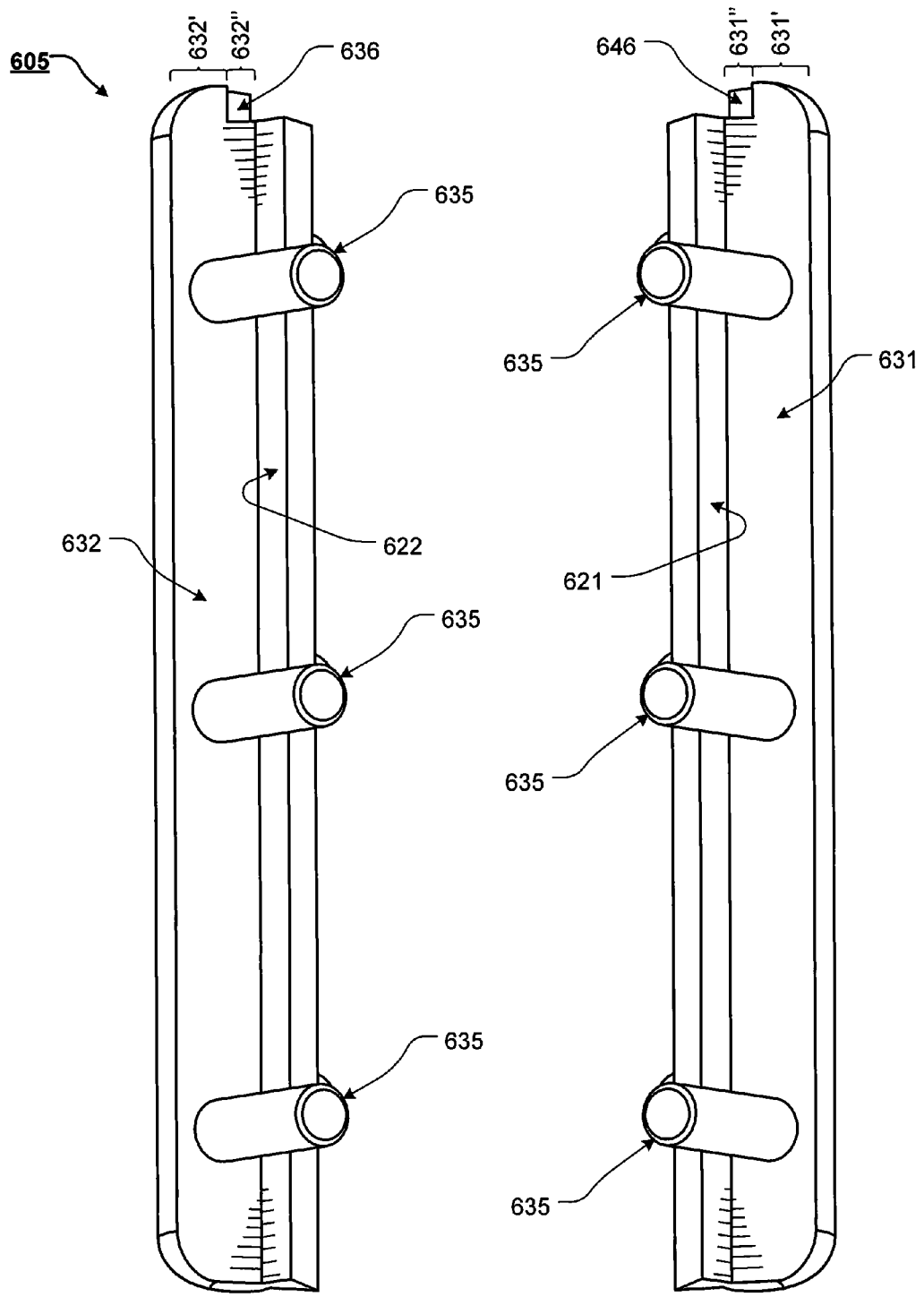
FIG. 46 is a left perspective view of the sixth exemplary embodiment of a corner connector element according to this invention.
FIG. 47 is a right perspective view of the sixth exemplary embodiment of a corner connector element according to this invention.
Figure 48:
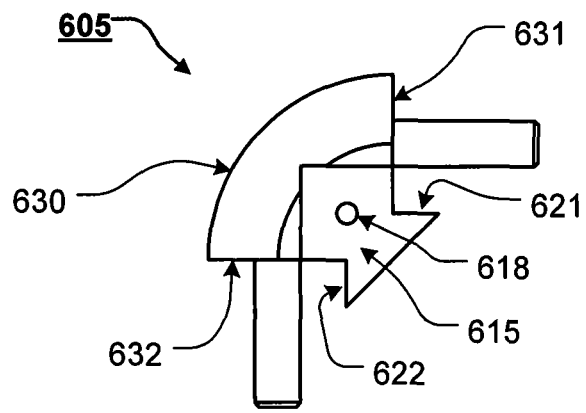
FIG. 48 is a top plan view of the sixth exemplary embodiment of a corner connector element according to this invention.
Figure 49:
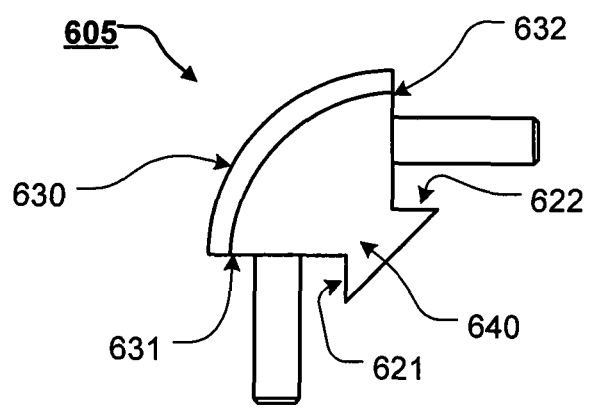
FIG. 49 is a bottom plan view of the sixth exemplary embodiment of a corner connector element according to this invention.
Figure 50:
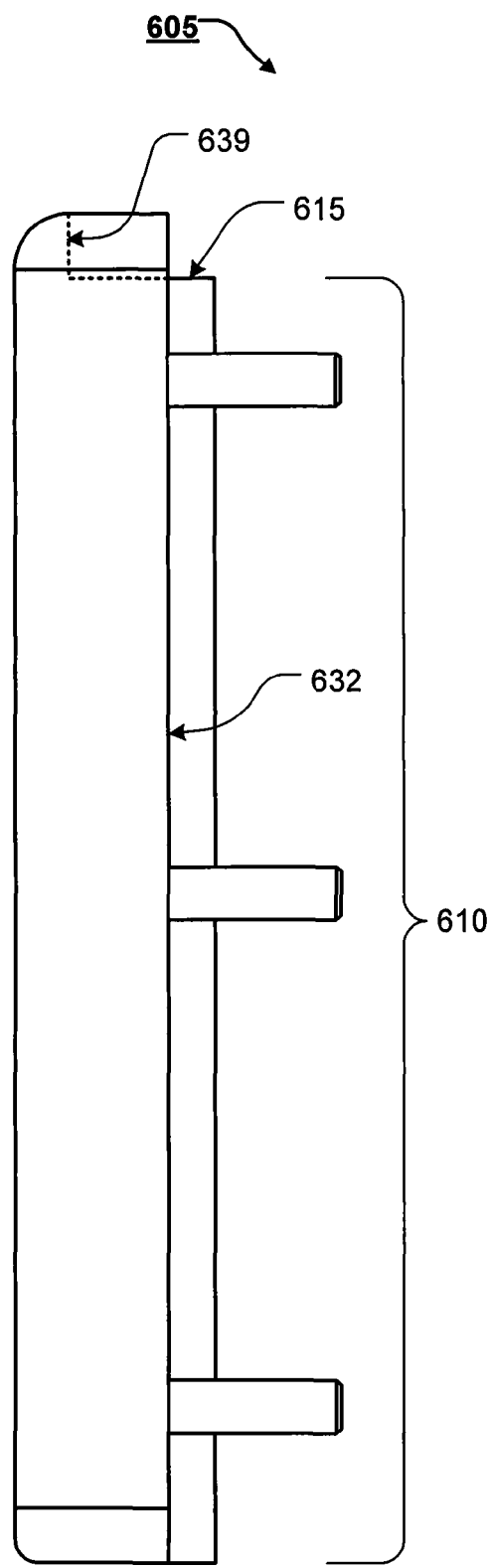
FIG. 50 is a left view of the sixth exemplary embodiment of a corner connector element according to this invention.
Figure 51:
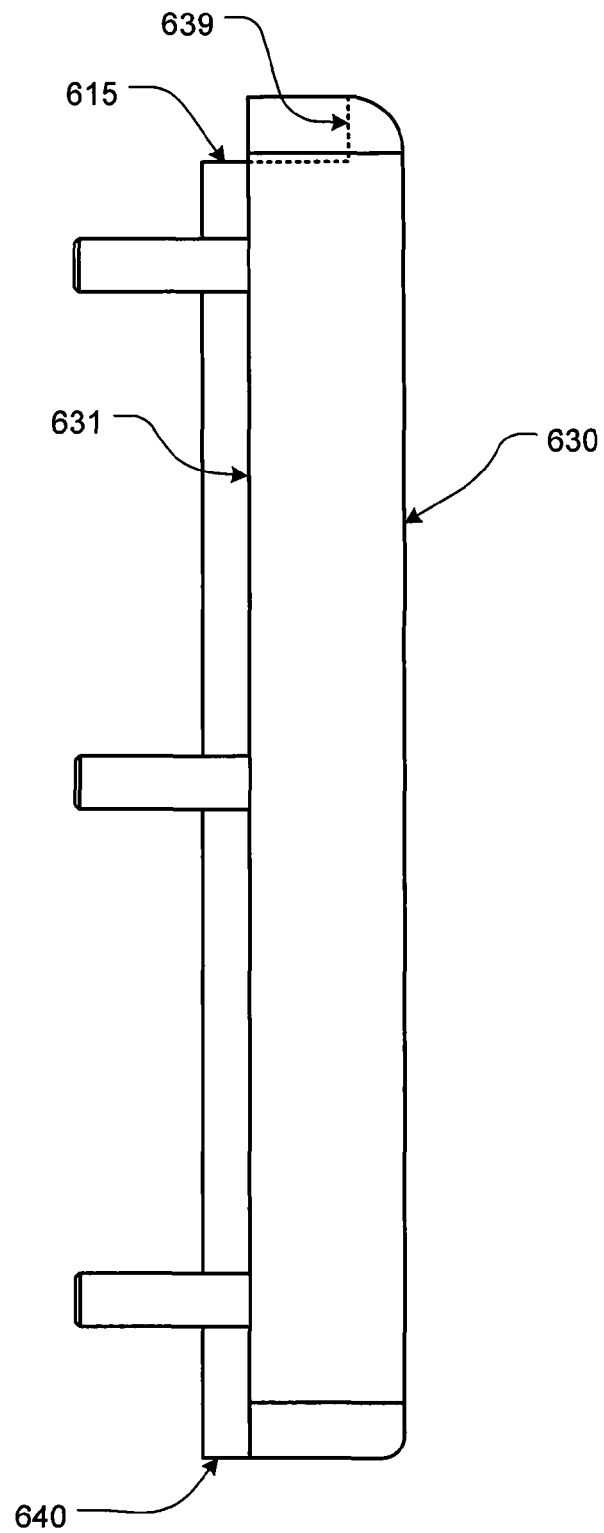
FIG. 51 is a right view of the sixth exemplary embodiment of a corner connector element according to this invention.

As shown in FIG. 38, the one or more recesses 437 are formed so as to interact with corresponding protrusions 438 extending from the first header element 461, the second header element 462, the first side rail element 471, and the second side rail element 472 to allow one of the protrusions 438 to be positioned within each recess 437 of the corner connector elements 405. Thus, for example, if the corner connector element 405 includes recesses 437, three mating protrusions 438 will be formed in each end of the first header element 461, the second header element 462, the first side rail element 471, and the second side rail element 472.

As further illustrated in FIG. 38, when properly positioned, the header elements 461 and 462 and the side rail elements 471 and 472 are each guided, by the interaction of the protrusions 438 and the recesses 437, so that the end surface of the header elements 461 and 462 and the side rail elements 471 and 472 contacts an appropriate first abutment surface 431 or second abutment surface 432, and an inner surface of the header elements 461 and 462 and the side rail elements 471 and 472 contacts an appropriate first side surface 421 or second side surface 422.

FIGS. 39-44 illustrate a fifth exemplary embodiment of a corner connector 505 according to this invention. As shown in FIGS. 39-44, the corner connector 505 includes at least some of a main body portion 510, a deck panel support surface 515, one or more attachment apertures 518, a first side surface 521, a second side surface 522, a radiused surface 530, a first abutment surface 531, a second abutment surface 532, recesses 537, a deck panel corner abutment surface 536, a corner 539, and a bottom surface 540.

It should be understood that each of these elements corresponds to and operates similarly to the deck panel support surface 415, the one or more attachment apertures 418, the first side surface 421, the second side surface 422, the radiused surface 430, the first abutment surface 431, the second abutment surface 432, the recesses 437, the deck panel corner abutment surface 436, the corner 439, and the bottom surface 440, as described above with reference to the corner connector element 405 of FIGS. 30-37.

However, as shown in FIGS. 39-44, the hollow portion 450 of the corner connector element 405 is not included and the main body portion 510 is solid, having a surface 550. It should be appreciated that the surface 550 may be substantially planar, concave, or convex.

FIGS. 45-51 illustrate a sixth exemplary embodiment of a corner connector according to this invention. As illustrated in FIGS. 45-51, the corner connector element 605 comprises at least some of a substantially pie-shaped body portion 610, a deck panel support surface 615, an optional first side surface 621, an optional second side surface 622, a radiused surface 630, a first abutment surface 631, a second abutment surface 632, one or more protrusions 635, a first deck panel corner abutment surface 636, a second deck panel corner abutment surface 646, a corner 639, and a bottom surface 640.

As illustrated in FIGS. 45-51, the substantially pie-shaped body portion 610 extends from the substantially planar bottom surface 640 to the substantially planar deck panel support surface 615. The substantially pie-shaped body portion 610 is further formed by the radiused surface 630, the first abutment surface 631, and the second abutment surface 632.

The first abutment surface 631 and the second abutment surface 632 are substantially planar, extend from, and are formed at substantially 90° relative to one another. Each of the first abutment surface 631 and the second abutment surface 632 extend to a terminating edge. The radiused surface 630 extends between a terminating edge of the first abutment surface 631 to a terminating edge of the second abutment surface 632.

If included, the optional first side surface 621 and the optional second side surface 622 are substantially planar and are formed at substantially 90° relative to one another. If included, the optional first side surface 621 extends substantially perpendicularly from a terminating edge of the first abutment surface 631. Likewise, the optional second side surface 622 extends substantially perpendicularly from a terminating edge of the second abutment surface 632.

One or more optional attachment apertures 618 may be formed in or through the deck panel support surface 615, the optional first side surface 621, and/or the optional second side surface 622. If included, the one or more optional attachment apertures 618 may be sized so as to allow a fasteners, such as, for example, a screw, to more easily attach to the corner connector element 605.

A first portion 631' of the first abutment surface 631 and a first portion 632' of the second abutment surface 632 extend above the deck panel support surface 615, while a second portion 631" of the first abutment surface 631 and a second portion 631" of the second abutment surface 632 terminate at the deck panel support surface 615.

In various exemplary embodiments, the first deck panel corner abutment surface 636 extends substantially perpendicularly from a terminating edge of the deck panel support surface 615 and the second deck panel corner abutment surface 646 extends substantially perpendicularly from a terminating edge of the deck panel support surface 615.

The corner 139 is defined by the intersection of the first deck panel corner abutment surface 636 and the second deck panel corner abutment surface 646. It should be appreciated that the first deck panel corner abutment surface 636 and the second deck panel corner abutment surface 646 are formed at substantially 90° relative to one another.

One or more protrusions 635 extend perpendicularly from the first abutment surface 631 and the second abutment surface 632. As illustrated in FIGS. 45-51, the corner connector element 605 includes three protrusions 635 extending from the first abutment surface 631 and three protrusions 635 extending from the second abutment surface 632. It should be appreciated that the number, size, and shape of protrusions 635 is a design choice based on the desired appearance and functionality of the corner connector element 605.

The protrusions 635 are formed so as to be aligned with and positioned within appropriately sized and shaped, mating recesses formed in the first header element 661, the second header element 662, the first side rail element 671, and the second side rail element 672. In this manner, the appropriate corner connector element 605 can be more readily aligned with the appropriate header element 661 or 662 and/or side rail element 671 or 672 when the mattress foundation assembly 600 is assembled.

In various exemplary embodiments, one or more recesses are optionally formed in the first abutment surface 631 and/or the second abutment surface 632 in an area between the protrusions 635. The one or more recesses 633 may provide additional strength and/or rigidity to the first abutment surface 631 and/or the second abutment surface 632.

In various exemplary embodiments, the corner connector element 605 is substantially rigid and is formed of a polymeric material such as a polymeric composite. Alternate materials of construction may include one or more of the following: wood, steel, aluminum, titanium, and/or other metals, as well as various alloys and composites thereof, glass-hardened polymers, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the corner connector element 605 is a design choice based on the desired appearance and functionality of the corner connector element 605.

It should be appreciated that the corner connector element 605 may be integrally formed. Alternatively, suitable materials can be used and sections or elements of the corner connector element 605 can be made independently and attached or coupled together, such as by adhesives, staples, screws, nails, or other fasteners, to form the corner connector element 605.

It should be understood that the overall size and shape of the corner connector element 605, and the various portions thereof, is a design choice based upon the desired functionality and/or appearance of the corner connector element 605. Additionally, it should be appreciated that the corner connector element 605 is formed such that multiple corner connector elements 605 may be positioned and used as each of the four corners of a mattress foundation assembly 600. Therefore, multiple corner connector elements do not have to be formed for a specific location at a specific corner of a mattress foundation assembly 600.

Figure 52:
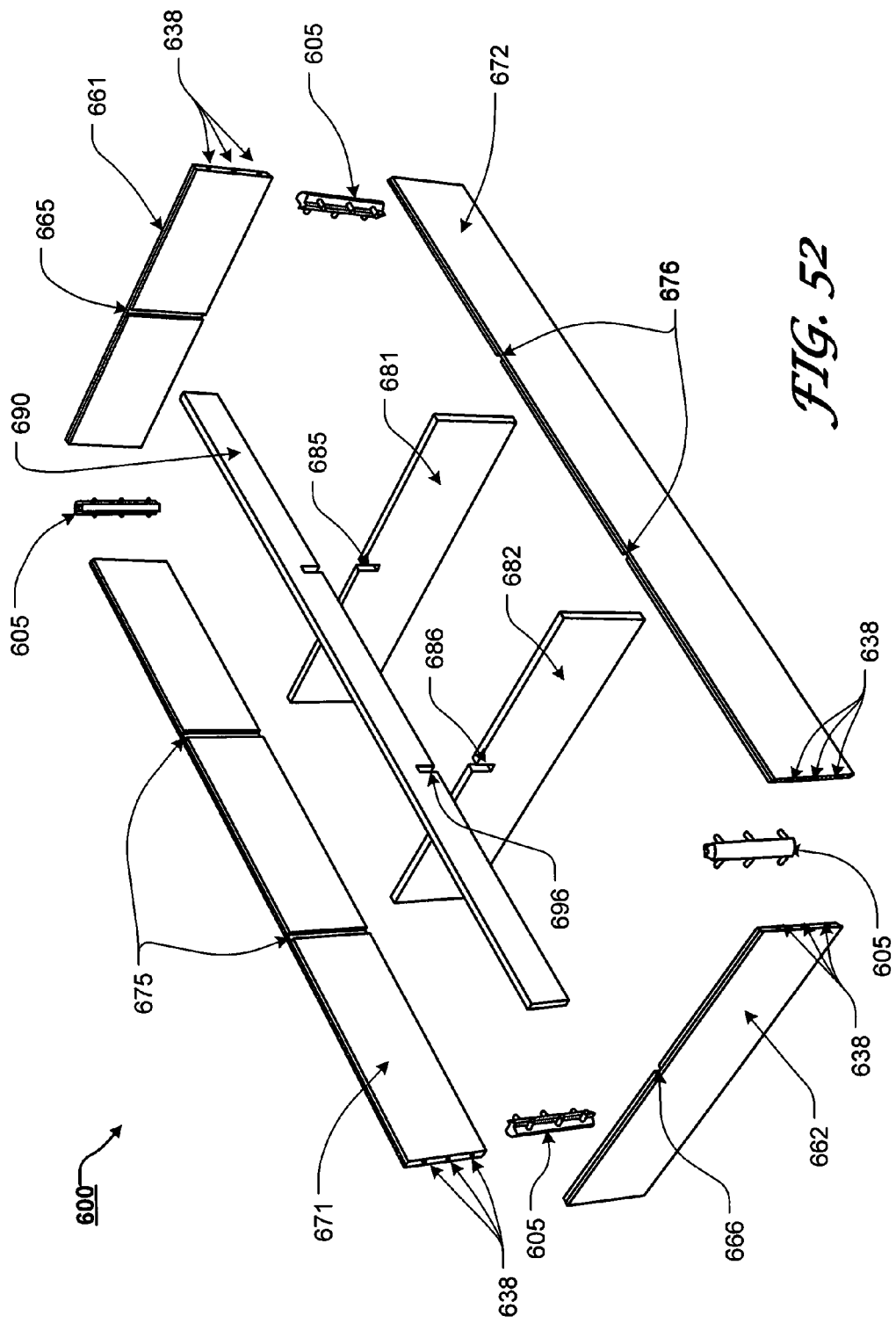
FIG. 52 shows an exploded perspective view of an exemplary embodiment of certain of the components of a mattress foundation assembly utilizing the sixth exemplary embodiment of a corner connector element according to this invention.

As illustrated in FIG. 52, the corner connector element 605 may be used to construct a mattress foundation assembly 600. As illustrated in FIG. 52, the mattress foundation assembly 600 comprises at least some of a plurality of corner connector elements 605, a first header element 661 having a first header element groove 665, a second header element 662 having a second header element groove 666, a first side rail element 671 having a first side rail element receiving groove 675, a second side rail element 672 having a second side rail element receiving groove 676, a first support rib 681 having a first support rib half-lap joint 685, a second support rib 682 having a second support rib half-lap joint 686, a spine element 690 having a spine element half-lap joint 696, and a top deck panel 698.

As shown in FIG. 52, one or more recesses 638 are formed in the first header element 661, the second header element 662, the first side rail element 671, and the second side rail element 672 so as to interact with corresponding protrusions 635 extending from the first abutment surface 631 and the second abutment surface 632 to allow one of the protrusions 635 of a corner connector element 605 to be positioned within each recess 638. Thus, for example, if the corner connector elements 605 each include three protrusions 635, three mating recesses 638 will be formed in each end of the first header element 661, the second header element 662, the first side rail element 671, and the second side rail element 672.

It should be appreciated that, when properly positioned, the header elements 661 and 662 and the side rail elements 671 and 672 are each guided, by the interaction of the protrusions 635 and the recesses 638, so that the end surface of the header elements 661 and 662 and the side rail elements 671 and 672 contacts an appropriate first abutment surface 631 or second abutment surface 632 to construct the mattress foundation assembly 600.

It should also be understood that the remaining elements of the mattress foundation assembly 600 are assembled in a manner similar to that described with reference to FIGS. 12-17.

Figure 53:
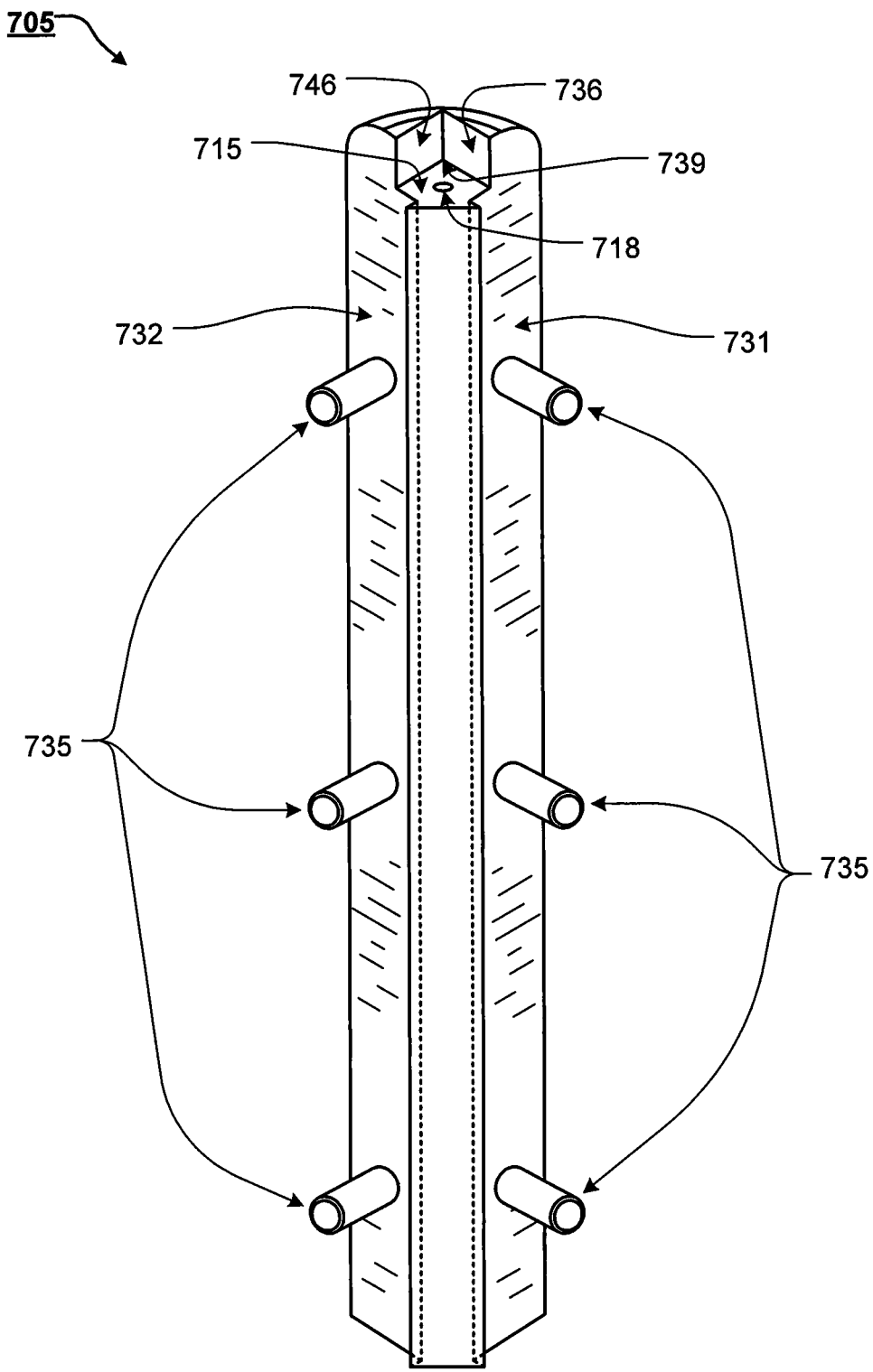
FIG. 53 is an isometric view of a seventh exemplary embodiment of a corner connector element according to this invention.
Figure 54:
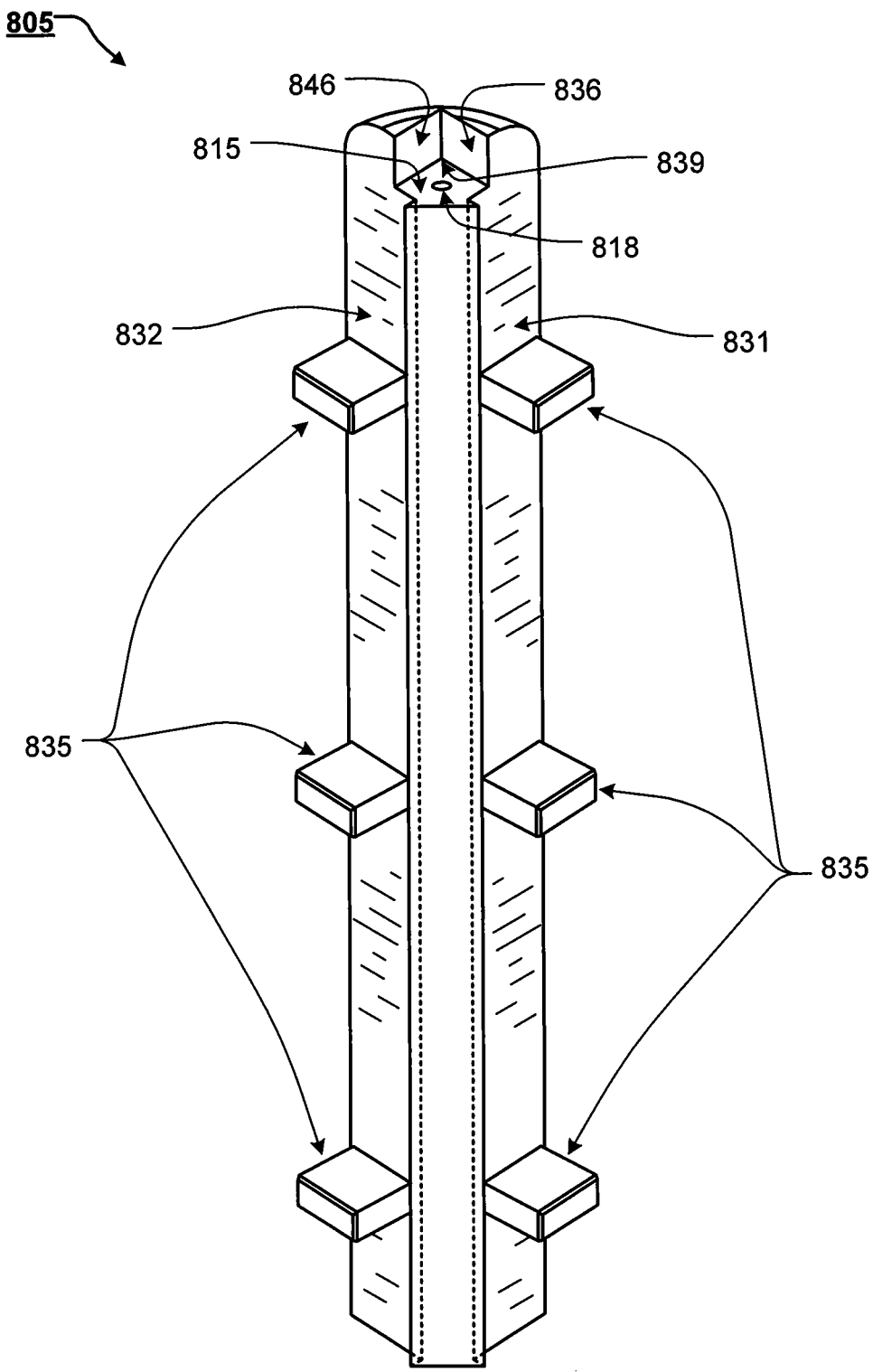
FIG. 54 is an isometric view of an eighth exemplary embodiment of a corner connector element according to this invention.
Figure 55:
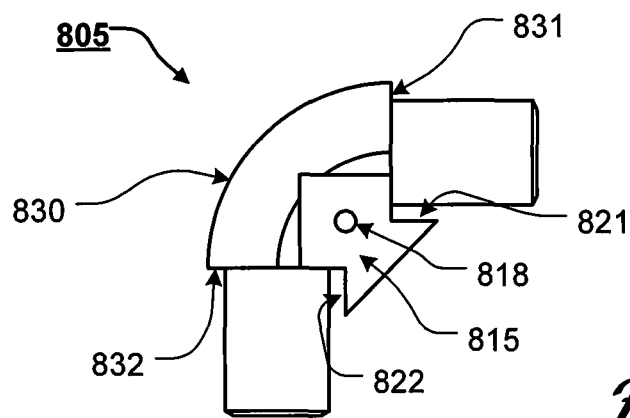
FIG. 55 is a top plan view of an eighth exemplary embodiment of a corner connector element according to this invention.
Figure 56:
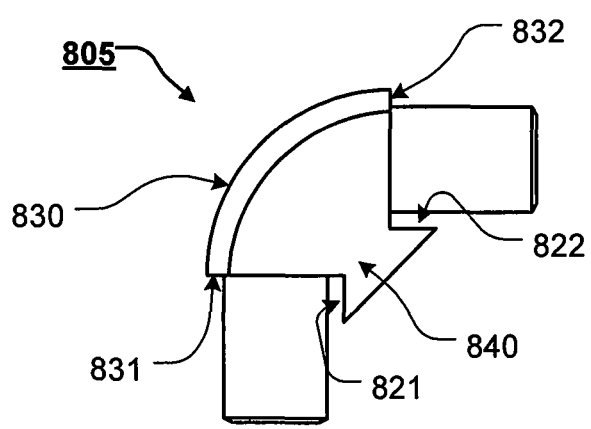
FIG. 56 is a bottom plan view of an eighth exemplary embodiment of a corner connector element according to this invention.
Figure 57:
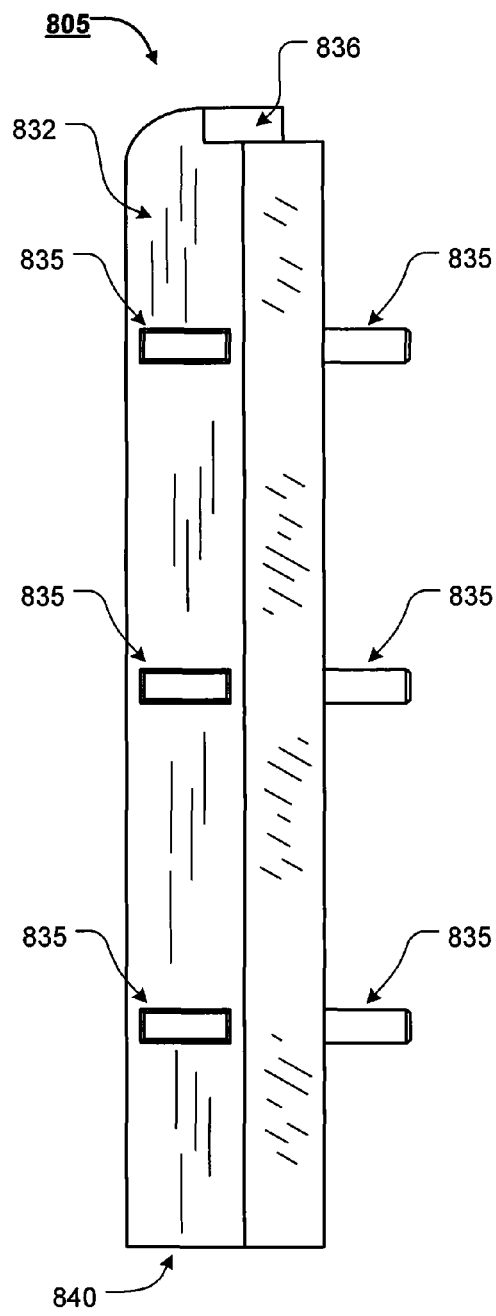
FIG. 57 is a left side view of an eighth exemplary embodiment of a corner connector element according to this invention.
Figure 58:
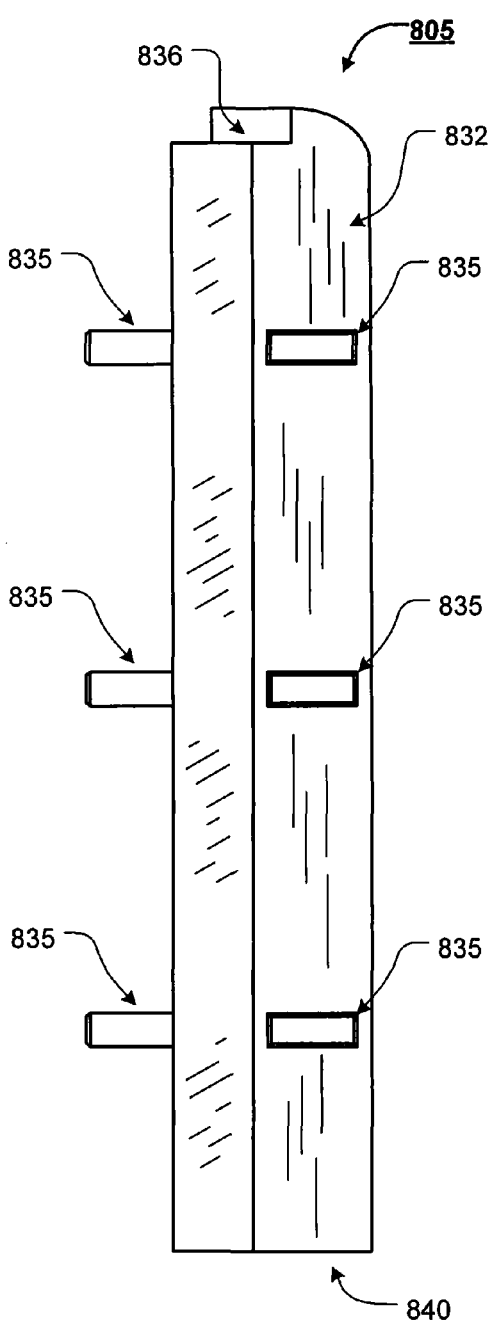
FIG. 58 is a right side view of an eighth exemplary embodiment of a corner connector element according to this invention.

FIG. 53 is an isometric view of a seventh exemplary embodiment of a corner connector element 705 according to this invention. As shown in FIG. 53, the corner connector 705 includes at least some of a main body portion 710, a deck panel support surface 715, one or more attachment apertures 718, an optional first side surface 721, an optional second side surface 722, a radiused surface 730, a first abutment surface 731, a second abutment surface 732, protrusions 735, a deck panel corner abutment surface 736, a corner 739, and a bottom surface 740.

It should be understood that each of these elements corresponds to and operates similarly to the deck panel support surface 615, the one or more attachment apertures 618, the optional first side surface 621, the optional second side surface 622, the radiused surface 630, the first abutment surface 631, the second abutment surface 632, the protrusions 635, the deck panel corner abutment surface 636, the corner 639, and the bottom surface 640, as described above with reference to the corner connector element 605 of FIGS. 45-51.

However, as shown in FIG. 53, the overall size of the optional first side surface 721 and the optional second side surface 722 is reduced, as compared to the overall size of the optional first side surface 621 and the optional second side surface 622, respectively.

FIGS. 54-58 show various views of an eighth exemplary embodiment of a corner connector element 805 according to this invention. As shown in FIG. 53, the corner connector 805 includes at least some of a main body portion 810, a deck panel support surface 815, one or more attachment apertures 818, an optional first side surface 821, an optional second side surface 822, a radiused surface 830, a first abutment surface 831, a second abutment surface 832, protrusions 835, a deck panel corner abutment surface 836, a corner 839, and a bottom surface 840.

It should be understood that each of these elements corresponds to and operates similarly to the deck panel support surface 615 and/or 715, the one or more attachment apertures 618 and/or 718, the optional first side surface 621 and/or 721, the optional second side surface 622 and/or 722, the radiused surface 630 and/or 730, the first abutment surface 631 and/or 731, the second abutment surface 632 and/or 732, the protrusions 635 and/or 735, the deck panel corner abutment surface 636 and/or 736, the corner 639 and/or 739, and the bottom surface 640 and/or 740, as described above with reference to the corner connector element 605 and/or 705 of FIGS. 45-51 and/or FIG. 53.

However, as shown in FIGS. 54-58, the protrusions 635 and 735 of corner connector elements 605 and 705, respectively, which have a substantially cylindrical geometry or circular profile, are replaced by protrusions 835, which have a substantially rectangular profile.

It should be appreciated that one or more recesses (similar to the one or more recesses 638 described herein) are formed in the various mattress foundation assembly elements so as to accept the protrusions 835 when a mattress foundation assembly is being assembled.

Figure 59:
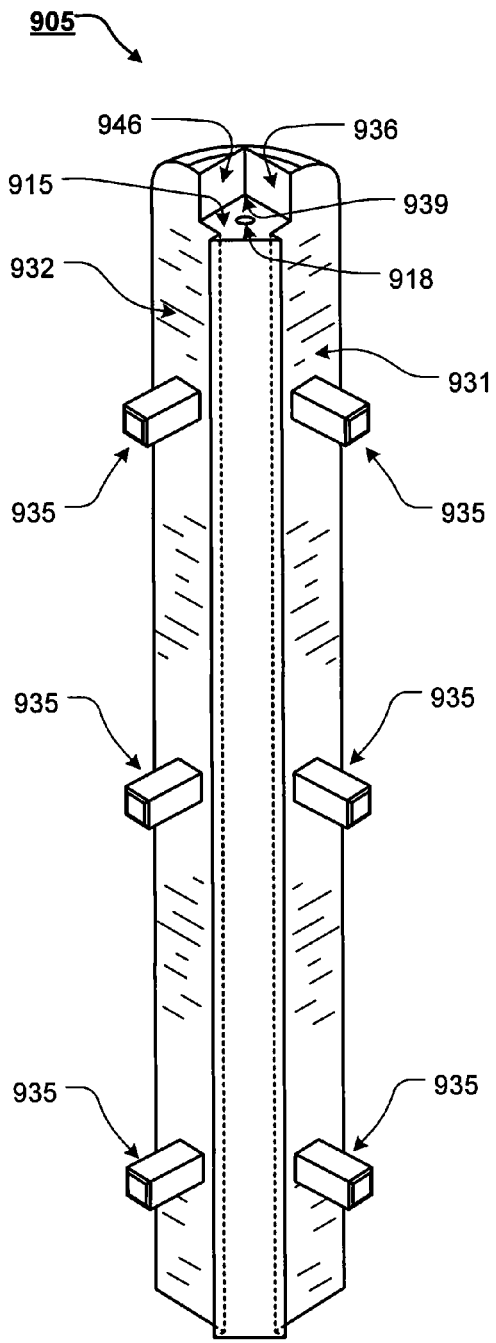
FIG. 59 is an isometric view of a ninth exemplary embodiment of a corner connector element according to this invention.
Figure 60:
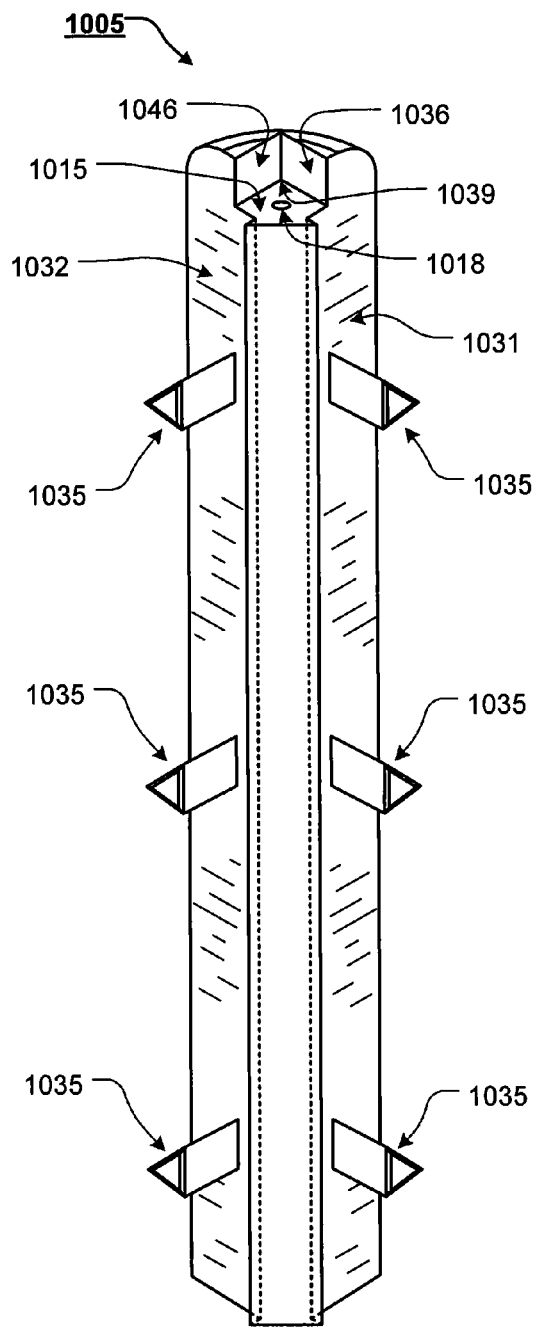
FIG. 60 is an isometric view of a tenth exemplary embodiment of a corner connector element according to this invention.

FIG. 59 shows a ninth exemplary embodiment of a corner connector element 905, while FIG. 60 shows a tenth exemplary embodiment of a corner connector element 1005 according to this invention. As illustrated in FIGS. 59 and 60, the protrusions 935 comprise protrusions having a substantially square profile, while protrusions 1035 comprise protrusions having a substantially triangular profile.

It should be appreciated that one or more recesses (similar to the one or more recesses 638 described herein) are formed in the various mattress foundation assembly elements so as to accept the protrusions 935 or 1035 when a mattress foundation assembly is being assembled.

Thus, it should also be appreciated that, for simplicity and clarification, the various exemplary, nonlimiting embodiments of the corner connector 605, 705, 805, 905, and 1005, are shown and/or described with reference to the protrusions 135, 235, 335, 635, 735, 835, 935, and 1035 having a relatively circular, rectangular, square, or triangular profile. However, the generally circular, rectangular, square, or triangular profile of the various protrusions are intended to be illustrative, not limiting the profile or geometry of the protrusions to any particular shape. It should be understood that the overall profile and/or geometry of the protrusions 135, 235, 335, 635, 735, 835, 935, and 1035 may comprise any overall profile or geometry, including, for example, a generally square, rectangle, triangular, pentangular, circular, oval, elliptical, elliptical torus, star, or other shape. Furthermore, the geometry of the one or more recesses of various embodiments of the corner connector may comprise any overall profile or geometry, including, for example, a generally square, rectangle, triangular, pentangular, circular, oval, elliptical, elliptical torus, star, or other shape.

Thus, it should be appreciated that the profile or geometry of the protrusions and/or recesses of the corner connector of this invention is a design choice based on the desired appearance, strength, and functionality of the corner connector.

While this invention has been described in conjunction with the exemplary embodiment(s) outlined above, it is evident that this invention is not limited to particular variation(s) set forth and many alternatives, adaptations, modifications, and variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Such alternatives, adaptations, modifications, and variations should and are intended to be and are comprehended within the meaning and range of equivalents of the disclosed exemplary embodiment(s) and may be substituted without departing from the true spirit and scope of the invention. It is to be understood that the phraseology of terminology employed herein is for the purpose of description and not of limitation. Accordingly, the foregoing description of the exemplary embodiments of the invention, as set forth above, are intended to be illustrative, not limiting and the fundamental design should not be considered to be necessarily so constrained. Various changes, modifications, and/or adaptations may be made without departing from the spirit and scope of this invention.

What is claimed is:

1. A corner connector element for a mattress foundation assembly, comprising:
   a body portion formed by a substantially planar first abutment surface, a substantially planar second abutment surface, and a radiused surface, wherein said first abutment surface extends to a first terminating edge, wherein said second abutment surface extends to a first terminating edge, wherein said first abutment surface and said second abutment surface are formed at substantially 90° relative to one another, and wherein said radiused surface extends between said first terminating edge of said first abutment surface and said first terminating edge of said second abutment surface;
   wherein a first portion of said first abutment surface extends from a substantially planar bottom surface to a substantially planar deck panel support surface and wherein a second portion of said first abutment surface extends from said bottom surface above said deck panel support surface;
   wherein a first portion of said second abutment surface extends from said bottom surface to said deck panel support surface and wherein a second portion of said second abutment surface extends from said bottom surface above said deck panel support surface;
   a first deck panel corner abutment surface extending substantially perpendicularly from a first terminating edge of the deck panel support surface between said first portion of said first abutment surface and said second portion of said first abutment surface;
   a second deck panel corner abutment surface extending substantially perpendicularly from a second terminating edge of the deck panel support surface between said first portion of said second abutment surface and said second portion of said second abutment surface, wherein the first deck panel corner abutment surface and said second deck panel corner abutment surface are formed at substantially 90° relative to one another;
   one or more protrusions extend perpendicularly from said first abutment surface; and
   one or more protrusions extend perpendicularly from said second abutment surface.

2. The corner connector of claim 1, further comprising:
   a substantially planar first side surface and a substantially planar second side surface, wherein said first side surface extends substantially perpendicularly from a second terminating edge of said first abutment surface, wherein said second side surface extends substantially perpendicularly from a second terminating edge of said second abutment surface, and wherein said first side surface and said second side surface are formed at substantially 90° relative to one another.

3. The corner connector of claim 1, wherein said corner connector element is formed of a polymeric material.

4. The corner connector of claim 1, wherein said corner connector element is formed of a metal.

5. The corner connector of claim 1, wherein said corner connector element is formed of wood.

6. The corner connector of claim 1, wherein said corner connector element is formed of two or more sections or elements attached or coupled together to form the corner connector element.

7. The corner connector of claim 1, wherein said corner connector element is formed as an integral unit.

8. The corner connector of claim 1, wherein each protrusion has a substantially circular, rectangular, square, or triangular profile.

9. A corner connector element for a mattress foundation assembly, comprising:
- a substantially planar first abutment surface, a substantially planar second abutment surface, and a radiused surface, wherein said first abutment surface extends to a first terminating edge, wherein said second abutment surface extends to a first terminating edge, wherein said first abutment surface and said second abutment surface are formed at substantially 90° relative to one another, and wherein said radiused surface extends between said first terminating edge of said first abutment surface and said first terminating edge of said second abutment surface;
- wherein a first portion of said first abutment surface extends from a substantially planar bottom surface to a substantially planar deck panel support surface and wherein a second portion of said first abutment surface extends from said bottom surface above said deck panel support surface;
- wherein a first portion of said second abutment surface extends from said bottom surface to said deck panel support surface and wherein a second portion of said second abutment surface extends from said bottom surface above said deck panel support surface;
- a substantially planar first side surface and a substantially planar second side surface, wherein said first side surface extends substantially perpendicularly from a second terminating edge of said first abutment surface, wherein said second side surface extends substantially perpendicularly from a second terminating edge of said second abutment surface, and wherein said first side surface and said second side surface are formed at substantially 90° relative to one another; and
- one or more protrusions extend perpendicularly from said first abutment surface;
- one or more protrusions extend perpendicularly from said second abutment surface.

10. The corner connector of claim 9, further comprising:
- a first deck panel corner abutment surface extending substantially perpendicularly from a first terminating edge of the deck panel support surface between said first portion of said first abutment surface and said second portion of said first abutment surface; and
- a second deck panel corner abutment surface extending substantially perpendicularly from a second terminating edge of the deck panel support surface between said first portion of said second abutment surface and said second portion of said second abutment surface, wherein the first deck panel corner abutment surface and said second deck panel corner abutment surface are formed at substantially 90° relative to one another.

11. The corner connector of claim 9, wherein said corner connector element is formed of two or more sections or elements attached or coupled together to form the corner connector element.

12. The corner connector of claim 9, wherein said corner connector element is formed as an integral unit.

13. The corner connector of claim 9, wherein each protrusion has a substantially circular, rectangular, square, or triangular profile.

14. A mattress foundation assembly, comprising:
- at least four corner connector elements, wherein each corner connector element comprises:
  - a body portion formed by a substantially planar first abutment surface, a substantially planar second abutment surface, and a radiused surface, wherein said first abutment surface extends to a first terminating edge, wherein said second abutment surface extends to a first terminating edge, wherein said first abutment surface and said second abutment surface are formed at substantially 90° relative to one another, and wherein said radiused surface extends between said first terminating edge of said first abutment surface and said first terminating edge of said second abutment surface;
  - wherein a first portion of said first abutment surface extends from a substantially planar bottom surface to a substantially planar deck panel support surface and wherein a second portion of said first abutment surface extends from said bottom surface above said deck panel support surface;
  - wherein a first portion of said second abutment surface extends from said bottom surface to said deck panel support surface and wherein a second portion of said second abutment surface extends from said bottom surface above said deck panel support surface;
  - a first deck panel corner abutment surface extending substantially perpendicularly from a first terminating edge of the deck panel support surface between said first portion of said first abutment surface and said second portion of said first abutment surface;
  - a second deck panel corner abutment surface extending substantially perpendicularly from a second terminating edge of the deck panel support surface between said first portion of said second abutment surface and said second portion of said second abutment surface, wherein the first deck panel corner abutment surface and said second deck panel corner abutment surface are formed at substantially 90° relative to one another; and
  - one or more protrusions extend perpendicularly from said first abutment surface;
  - one or more protrusions extend perpendicularly from said second abutment surface;
- said mattress foundation assembly further comprising:
- a first header element, wherein said first header element comprises an elongate portion of material having a first terminating end and a second terminating end, wherein one or more recesses are formed in said first terminating end and said second terminating end of said first header element, and wherein said first header element comprises at least one groove formed in an interior side of said first header element, perpendicular to a longitudinal axis of said first header element;
- a second header element, wherein said second header element comprises an elongate portion of material having a first terminating end and a second terminating end, wherein one or more recesses are formed in said first terminating end and said second terminating end of said second header element, and wherein said second header element comprises at least one groove formed in an interior side of said second header element, perpendicular to a longitudinal axis of said second header element, and wherein said first header element and said second header element are of equal length;
- a first side rail element, wherein said first side rail element comprises an elongate portion of material having a first terminating end and a second terminating end, wherein one or more recesses are formed in said first terminating end and said second terminating end of said first side rail element, and wherein said first side rail element comprises at least one groove formed in an interior side of said first side rail element, perpendicular to a longitudinal axis of said first side rail element;

a second side rail element, wherein said second side rail element comprises an elongate portion of material having a first terminating end and a second terminating end, wherein one or more recesses are formed in said first terminating end and said second terminating end of said second side rail element, and wherein said second side rail element comprises at least one groove formed in an interior side of said second side rail element, perpendicular to a longitudinal axis of said second side rail element, and wherein said first side rail element and said second side rail element are of equal length;

wherein said protrusions extending from said first abutment surface of a first corner connector element are fitted within said recesses of said first terminating end of said first header element;

wherein said protrusions extending from said second abutment surface of a second corner connector element are fitted within said recesses of said second terminating end of said first header element;

wherein said protrusions extending from said first abutment surface of said second corner connector element are fitted within said recesses of first terminating end of a first side rail element;

wherein said protrusions extending from said second abutment surface of a third corner connector element are fitted within said recesses of a second terminating end of said first side rail element;

wherein said protrusions extending from said first abutment surface of said third corner connector element are fitted within said recesses of said first terminating end of said second header element;

wherein said protrusions extending from said second abutment surface of a forth corner connector element are fitted within said recesses of said second terminating end of said second header element;

wherein said protrusions extending from said first abutment surface of said forth corner connector element are fitted within said recesses of said first terminating end of said second side rail element;

wherein said protrusions extending from said second abutment surface of said first corner connector element are fitted within said recesses of said second terminating end of said second side rail element;

at least one support rib, wherein said at least one support rib comprises an elongate portion of material having a first terminating end and a second terminating end, wherein said at least one support rib comprises at least one support rib half-lap joint formed in a top portion of said at least one support rib, and wherein said first terminating end of said at least one support rib is at least partially secured within said at least one groove formed in said interior side of said first side rail element and said second terminating end of said at least one support rib is at least partially secured within said at least one groove formed in said interior side of said second side rail element;

at least one spine element, wherein said at least one spine element comprises an elongate portion of material having a first terminating end and a second terminating end, wherein said at least one spine element comprises at least one spine element half-lap joint formed in a bottom portion of said at least one spine element to correspond to said at least one support rib half-lap joint, wherein said first terminating end of said at least one spine element is at least partially secured within said at least one groove formed in said interior side of said first header element and said second terminating end of said at least one spine element is at least partially secured within said at least one groove formed in said interior side of said second header element, and wherein said at least one spine element half-lap joint is coupled to a corresponding support rib half-lap joint; and a top deck panel secured atop said at least one spine element and said at least one support rib, within a recessed notch formed in each of said first header element, said second header element, said first side rail element, and said second side rail element, and within said first deck panel corner abutment surface of each corner connector element.

15. The mattress foundation assembly of claim 14, further comprising:

at least one additional support rib, wherein said at least one support rib comprises an elongate portion of material having a first terminating end and a second terminating end, wherein said at least one support rib comprises at least one additional support rib half-lap joint formed in a top portion of said at least one additional support rib, and wherein said first terminating end of said at least one support rib is at least partially secured within said at least one additional groove formed in said interior side of said first side rail element and said second terminating end of said at least one support rib is at least partially secured within said at least one additional groove formed in said interior side of said second side rail element; and wherein said at least one spine element comprises at least one additional spine element half-lap joint formed in a bottom portion of said at least one spine element to correspond to said at least one additional support rib half-lap joint formed in a top portion of said at least one additional support rib.

16. The mattress foundation assembly of claim 14, wherein said abutment surfaces of said corner connector elements are attached, via fasteners, to said header element and said side rail elements.

17. The mattress foundation assembly, of claim 14, wherein said abutment surfaces of said corner connector elements are attached, via an adhesive, to said header element and said side rail elements.

18. The mattress foundation assembly of claim 14, wherein said support rib is secured, via fasteners, within said corresponding first side rail element receiving groove and said second side rail element receiving groove, and wherein said spine is secured, via fasteners, within said corresponding first header element receiving groove and second header element receiving groove.

19. The mattress foundation assembly of claim 14, wherein said support rib is secured, via an adhesive, within said corresponding first side rail element receiving groove and second side rail element receiving groove, and wherein said spine is secured, via an adhesive, within said corresponding first header element receiving groove and second header element receiving groove.

20. The mattress foundation assembly of claim 14, wherein said recessed notch of said first header element, said second header element, said first side rail element, and said second side rail element, is formed so as to allow said top deck panel to be flush-mounted with a deck panel support surface of said header elements and said rail elements.

* * * * *